United States Patent
Felkey et al.

(10) Patent No.: US 6,910,187 B2
(45) Date of Patent: Jun. 21, 2005

(54) GRAPHICAL USER INTERFACE FOR PROCURING TELECOMMUNICATIONS SERVICES ON-LINE

(75) Inventors: Mark A. Felkey, Colorado Springs, CO (US); Tyler J. West, Atlanta, GA (US); Susan O. Diemer, Reston, VA (US); Michael E. Marcellin, Ashburn, VA (US); Diane L. Sabatini, McLean, VA (US); Elaine S. Mason, Stone Mountain, GA (US); David K. Braverman, Alpharetta, GA (US); Patricia A. Boyer, Fairfax Station, VA (US)

(73) Assignee: MCI, Inc., Ashburn, VA (US)

( * ) Notice: Subject to any disclaimer, the term of this patent is extended or adjusted under 35 U.S.C. 154(b) by 513 days.

(21) Appl. No.: 10/051,182

(22) Filed: Jan. 22, 2002

(65) Prior Publication Data
US 2002/0140741 A1 Oct. 3, 2002

Related U.S. Application Data

(60) Provisional application No. 60/263,222, filed on Jan. 23, 2001.

(51) Int. Cl.[7] ............................................... G06F 15/00
(52) U.S. Cl. ..................................... 715/733; 715/854
(58) Field of Search ............................... 715/733, 740, 715/751, 854

(56) References Cited

U.S. PATENT DOCUMENTS 5,958,051 A    9/1999  Renaud et al.
6,012,152 A    1/2000  Douik et al.
6,334,114 B1 * 12/2001 Jacobs et al. .................. 705/26
6,366,893 B2 *  4/2002 Hannula et al. ............... 705/40
6,429,812 B1    8/2002  Hoffberg
6,473,097 B1 * 10/2002 Elliott ......................... 345/733

OTHER PUBLICATIONS

U.S. Appl. No. 10/051,282, filed Jan. 2002, Felkey et al.

U.S. Appl. No. 10/051,180, filed Jan. 2002, Felkey et al.

* cited by examiner

*Primary Examiner*—Cao (Kevin) Nguyen

(57) ABSTRACT

A system and method for procuring and servicing telecommunications offerings on-line, including a server. The server including a server program configured to transmit data for generating a customer GUI on a customer computer, the customer GUI including a telecommunications offerings region, including a voice telecommunications offerings sub-region for providing access to voice telecommunications offerings, an Internet telecommunications offerings sub-region for providing access to Internet telecommunications offerings, and a mobile telecommunications offerings sub-region for providing access to mobile telecommunications offerings. The server program further configured to generate a back office GUI on a back office computer, the back office GUI including a search region located in a central portion thereof and including a search for dropdown list, a search criteria sub-region, and reset and search buttons. The back office GUI also including a tab region located in an upper portion thereof and including log off, user home, manage agents, customer home, shop, and cart tabs.

38 Claims, 43 Drawing Sheets

FIG. 5E

SEARCH: [  ] »

VIEW CART & CHECKOUT | GLOSSARY | HELP | PRIVACY | ABOUT

Connecting Your Business to Success

CONNECT YOUR BUSINESS TO INTELLIGENT ADVICE: KNOWLEDGABLE STAFF

VoiceCenter ☐
Phone services that connect you and your customers

NetConnect ☐
Internet connections appropriate for your business

MobileSolutions ☐
Offerings to open your workspace and keep you connected

CompleteCalling   [ MORE INFO » ]
③ IN ①
local + long distance + toll free

BetterBusiness
Learn to strengthen your business through technology
What to look for in an internet provider
Voice Technology                    Save time & Money

---

AccountDirect

Welcome

[ LOG OUT » ]   — 502f
▶ Account review — 504f
▶ Saved product info — 506f
▶ Invite colleagues
▶ Notification list — 508f
▶ Edit profile — 510f
Support & Solve — 512f

[ ] Online staff is here to help, every step of the way
[ GO TO SUPPORT » ]
Chat now with a specialist
[ OPEN CHAT » ]
Mon-Fri, 8am-8pm ET

FIG. 5F

AccountDirect

LOG IN: Access your account username
(your email)

password

[LOG IN »]

[FORGOT PASSWORD? »]

New to direct
[SIGN UP NOW »]
Make managing communications easier

Support & Solve
Online staff is here to help, every step of the way
[GO TO SUPPORT »]

Chat now with a specialist
[OPEN CHAT »]
Mon-Fri, 8am-8pm ET

---

SEARCH: [ ] [»]

VIEW CART & CHECKOUT | GLOSSARY | HELP | PRIVACY | ABOUT

| VoiceCenter | NetConnect | MobileSolutions | BetterBusiness |

Connecting Your Business to Success

Home > Registration

Registration — 502j

Yes, I have an account.

Please sign in below to help expedite your ordering process

E-mail Address [ ] — 504j
Password [*********]

Forgot your password

[CONTINUE] — 506j

---

No, I don't have an account yet. — 508j

For fastest access to our products and services, such as online order tracking, account management, and service adjustments, please register for a direct account.

| AccountDirect | Connecting Your Business to Success | | | SEARCH: ⟫ |
|---|---|---|---|---|
| | VoiceCenter | NetConnect | HostingPlus | MobileSolutions |
| | 🛒 VIEW CART & CHECKOUT | GLOSSARY | HELP | PRIVACY | ABOUT | BetterBusiness | | | |

Welcome,
First name/e-mail
Company name

▶ Account review
▲ Saved product info
▲ Invite colleagues
▲ Notification list
▲ Edit profile
LOG OUT ⟫

Support & Solve

Online staff is here to help, every step of the way

GO TO SUPPORT ⟫

Chat now with a specialist
OPEN CHAT ⟫
Mon-Fri, 8am-8pm ET

Home > Manage Services

AccountDirect

Account Review

Review and control your company's communications accounts.

FPO info text to explain the status process and the system by which to measure and manage the progress of your order. — 502m Sort by: Order Name | Product/Service | Address | Status | Order Date — 504m

| Order Date | Product/Service | Address (if applicable) | Order Number | Current Status |
|---|---|---|---|---|
| 05/06/01 | Internet Dial | Washington, DC | 00001 | Complete 00000 [DETAILS] |
| 05/06/01 | Internet Dial | Washington, DC | 00001 | On Hold ⚠ [DETAILS] |
| 05/06/01 | Internet Dial | Washington, DC | 00001 | Cancelled ⚠ [DETAILS] |

506m ⟶   508m ⟶

⚠ FPO intro text to explain the status process and the system by which to measure and manage the progress of your order.

| USER HOME | MANAGE AGENTS | CUSTOMER HOME | SHOP | CART |

Modify Back Office User Detail Information

Instructions
Modify agent detail information below.

Agent Name:
Inactivate3

User Type
[Back Office User ▼]

○ Activate
◉ Inactivate          — 602c

Password
[           ]

Retype Password
[           ]          — 604c

First Name
[Inactivate3]

Last Name
[Inactivate3]

Email Address
[                    ]

Phone Number
[   ] - [    ] x [   ]

[SAVE] [CANCEL]    — 606c

User Home | Manage Agents | Customer Home | Shop | Cart

| | | Customer Name |
|---|---|---|
| | User | Administrator, Administrator |
| USER HOME / MANAGE AGENTS / CUSTOMER HOME / SHOP / CART | | |

CONFIGURE PRODUCT

Instructions
To configure your product, enter the information requested in the fields below. Click the "CONTINUE" button when finished.

Product: Dedicated Internet - Basic Plan w/Router

Enter order contact information.

First name [____602j____] Last name [____604j____]

Phone Number [__]-[__]-[__] ext [__]

Enter your service address

Address 1 [_____]
Address 2 [_____]
City [____606j____]
State [____▸__] Zip Code [_____]

Configuration Parameters

List your existing customer premise equipment, if known.

FIG. 6J

Pricing and Billing — 602m

| | |
|---|---|
| Monthly Recurring Charge | $ 15.95 per month |
| Monthly Allotment | 50 hours |
| Usage Charges | |
| Overage Charge | $ 1.50 per hour over 50 hours |
| Optional Domestic Toll Free Access | $ 3.50 per hour |
| Non-contingent Domestic Access | $ 2.00 per hour |
| International Access | $ 2.00 per hour |
| One-Time Charges | No Installation Charges |
| Payment Method | Monthly invoice billing |

604m

BACK    ADD TO CART — 606m

User Home | Manage Agents | Customer Home | Shop | Cart

FIG. 6M

ORDER DETAIL

USER HOME / MANAGE AGENTS / CUSTOMER HOME / SHOP / CART

User Administrator, Administrator    Customer Name    RELEASE CUSTOMER    LOGOFF Order #: 1000972
Date Ordered:
Status: Submitted
Contact Name:
Contact Telephone:
Last Modified User:

6040

Order Pro #: [    ]   6020
Order Pro Status: [Not Entered ▼]
NASP ID:
IXPlus Number:
Assigned IE: [None Selected]
Promo Code:

6060

| Qty | Description | Status | Service Address | One Time Charge | Recurring Charge |
|---|---|---|---|---|---|
| 5 | 1-Way Alphanumeric Paging - Metro Plan | Submitted | None available | $524.75 | $54.95 |
| | | | Totals: | $524.75 | $54.95 |

[PREVIOUS]   [NEXT]   [UPDATE]   [NOTES]

6080

[BACK]

User Home | Manage Agents | Customer Home | Shop | Cart

FIG. 60

| USER HOME | MANAGE AGENTS | CUSTOMER HOME | SHOP | CART |

ORDER STATUS HISTORY

Instructions
Please review information. When you are finished please click on the "CANCEL" button.
//fill up appropriate instructions later//

Order number: _____ 602p
Current Status: Submitted

Company Name: _____
        Change Status to: [Cancelled ▼]

| Date Status Updated | Status | Status Updated by | Letter Sent | Date Sent |
|---|---|---|---|---|
| | Submitted | 604p | YES | |

[SAVE AND SEND]    [SAVE AND NOT SEND]    [CANCEL] 606p

User Home | Manage Agents | Customer Home | Shop | Cart

GRAPHICAL USER INTERFACE FOR PROCURING TELECOMMUNICATIONS SERVICES ON-LINE

CROSS REFERENCE TO RELATED CASES

The present invention claims the benefit of priority under 35 U.S.C. § 119(e) to U.S. Provisional Patent Application No. 60/263,222 of Diemer et al, entitled "ON-LINE SERVICING SYSTEM," filed on Jan. 23, 2001.

BACKGROUND OF THE INVENTION

1. Field of the Invention

The present invention relates to an information processing system and more particularly to a graphical user interface for procuring telecommunications offerings (e.g., telecommunications products and/or services) on-line.

2. Discussion of the Background

From the perspective of the customers of telecommunication services, the interaction between them and the customer representatives have been inefficient and frustrating. Because of the emergence of the many, and often perplexing, telecommunication services, the experience that the customers undergo when procuring services is far from user friendly. Further, customers do not enjoy dialing into a call center to wait in queue for a customer representative to tend to them, with no guarantees that the customer representative can adequately service their needs.

Service providers, therefore, have sought to provide a self-service on-line system through the use of the World Wide Web (WWW). However, ineffective user interfaces and non-integrated systems have introduced the same, if not greater, level of frustration than interacting with a live human. In particular, in light of the sophistication of modem telecommunication services, a live person may be required to intercede in the procurement process.

Based on the foregoing, there is a clear need for improved approaches for servicing customers via an on-line system to procure telecommunications services. There is also a need to enhance the efficiency of provisioning telecommunications services for the customers. There is a further need to cater to customers of varying level of sophistication, such that customers who require greater assistance are given the necessary attention.

Based on the need to enhance the customer experience in procuring telecommunication services, an approach for implementing an on-line system that provides a user-friendly and efficient mechanism to acquire services from a service provider is highly desirable.

SUMMARY OF THE INVENTION

The present invention addresses the above stated and other needs by providing an on-line system that offers an effective mechanism to efficiently procure telecommunication services. The system provides a new customer experience for pre-sale, order processing, and post-sale support. For pre-sale services, a prospective customer links to the site of, for example, a proprietary telecommunications service provider (or directly at a site promoting itself) and are presented with product materials and tools. Once the prospective customer has determined the services appropriate to his/her business and the system has qualified them, they may enter a Shopping Cart/Service Ordering section of the site, select their services and click on, for example, an "Order Now" button to proceed. Afterwards, a new customer may then enter either the site (or other on-line applications, such as Interact, etc.) to check order status, manage existing services, place additional orders, pay on-line, etc.

According to one aspect of the invention, there is provided a method for procuring telecommunications offerings on-line, including presenting a graphical user interface (GUI), including a telecommunications offerings region located in a portion of the GUI, the telecommunications offerings region including, a voice telecommunications offerings sub-region for providing access to voice telecommunications offerings, an Internet telecommunications offerings sub-region for providing access to Internet telecommunications offerings, and a mobile telecommunications offerings sub-region for providing access to mobile telecommunications offerings.

According to another aspect of the invention, there is provided a method for procuring telecommunications offerings on-line, including presenting a graphical user interface (GUI), including a search region located in a central portion of the GUI, the search region including a search for dropdown list, a search criteria sub-region, and reset and search buttons; and a tab region located in an upper portion of the GUI and including log off, user home, manage agents, customer home, shop, and cart tabs. The search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the GUI, the customer home tab is configured to display a customer facing GUI, the shop tab is configured to display web links to information on the telecommunications offerings, and the cart tab is configured to display a window including a shopping cart function.

According to another aspect of the invention, there is provided a method for generating a graphical user interface (GUI) for procuring telecommunications offerings on-line, including generating a telecommunications offerings region located in a portion of the GUI; generating, in the telecommunications offerings region, a voice telecommunications offerings sub-region for providing access to voice telecommunications offerings; generating, in the telecommunications offerings region, an Internet telecommunications offerings sub-region for providing access to Internet telecommunications offerings; and generating, in the telecommunications offerings region, a mobile telecommunications offerings sub-region for providing access to mobile telecommunications offerings.

According to another aspect of the invention, there is provided a method for generating a graphical user interface (GUI) for servicing telecommunications offerings on-line, including generating a search region located in a central portion of the GUI, the search region including a search for dropdown list, a search criteria sub-region, and reset and search buttons; and generating a tab region located in an upper portion of the GUI and including log off, user home, manage agents, customer home, shop, and cart tabs. The search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the GUI, the customer home tab is configured to display a customer facing GUI, the shop tab is configured to display web links to information on the telecommunications offerings, and the cart tab is configured to display a window including a shopping cart function.

According to another aspect of the invention, there is provided a method for generating graphical user interfaces (GUIs) for procuring and servicing telecommunications offerings on-line, including generating a telecommunications offerings region located in a portion of a first GUI; generating, in the telecommunications offerings region, a voice telecommunications offerings sub-region for providing access to voice telecommunications offerings; generating, in the telecommunications offerings region, an Internet telecommunications offerings sub-region for providing access to Internet telecommunications offerings; generating, in the telecommunications offerings region, a mobile telecommunications offerings sub-region for providing access to mobile telecommunications offerings; generating a search region located in a central portion of a second GUI, the search region including a search for dropdown list, a search criteria sub-region, and reset and search buttons; and generating a tab region located in an upper portion of the second GUI and including log off, user home, manage agents, customer home, shop, and cart tabs.

According to another aspect of the invention, there is provided a system for procuring and servicing telecommunications offerings on-line, including a server including a server program configured to transmit data for generating a customer GUI on a customer computer, the customer GUI including a telecommunications offerings region, including a voice telecommunications offerings sub-region for providing access to voice telecommunications offerings, an Internet telecommunications offerings sub-region for providing access to Internet telecommunications offerings, and a mobile telecommunications offerings sub-region for providing access to mobile telecommunications offerings; the server program configured to generate a back office GUI on a back office computer, the back office GUI including a search region located in a central portion thereof and including a search for dropdown list, a search criteria sub-region, and reset and search buttons; and the back office GUI including a tab region located in an upper portion thereof and including log off, user home, manage agents, customer home, shop, and cart tabs.

According to another aspect of the invention, there is provided a graphical user interface (GUI) apparatus for procuring telecommunications offerings on-line, including means for generating a telecommunications offerings region located in a portion of the GUI; means for generating, in the telecommunications offerings region, a voice telecommunications offerings sub-region for providing access to voice telecommunications offerings; means for generating, in the telecommunications offerings region, an Internet telecommunications offerings sub-region for providing access to Internet telecommunications offerings; and means for generating, in the telecommunications offerings region, a mobile telecommunications offerings sub-region for providing access to mobile telecommunications offerings.

According to another aspect of the invention, there is provided a graphical user interface (GUI) apparatus for servicing telecommunications offerings on-line, including means for generating a search region located in a central portion of the GUI, the search region including a search for dropdown list, a search criteria sub-region, and reset and search buttons; and means for generating a tab region located in an upper portion of the GUI and including log off, user home, manage agents, customer home, shop, and cart tabs. The search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the GUI, the customer home tab is configured to display a customer facing GUI, the shop tab is configured to display web links to information on the telecommunications offerings, and the cart tab is configured to display a window including a shopping cart function.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The following commonly owned co-pending U.S. patent application Ser. No. 10/051,180, filed Jan. 22, 2002, entitled "Method And System For Providing Software Integration For A Telecommunications Services On-Line Procurement System," and U.S. patent application Ser. No. 10/051,282, filed Jan. 22, 2002, entitled "Method And System For Procuring Telecommunications Services On-Line,", are incorporated herein by reference.

A graphical user interface procuring telecommunications products on-line are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figure 1:
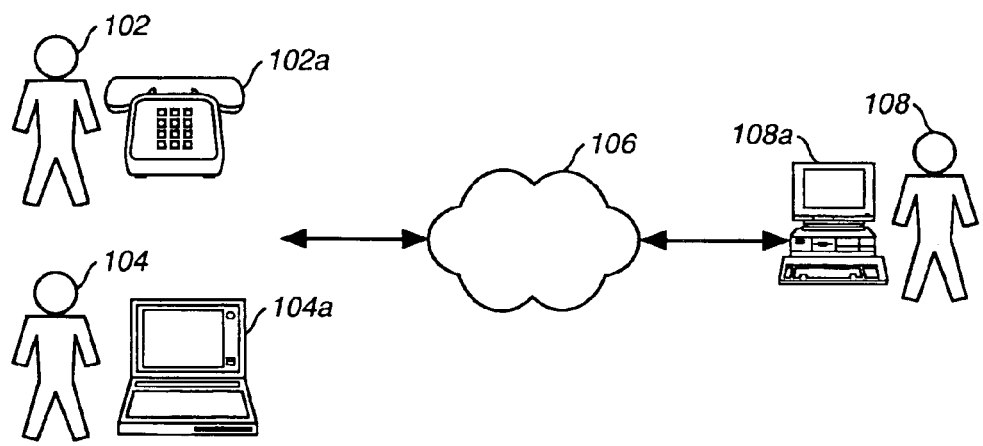
FIG. 1 is a top-level block diagram illustrating a system for procuring telecommunications products and/or services.

The present invention includes recognition of problems associated with tradition systems and methods for procuring telecommunications products and/or services. In FIG. 1, a system 100 for procuring telecommunications products and/or services is shown and includes one or more customers 102 and 104 and customer devices 102a and 104a (i.e., a telephone and personal computer) coupled to a communications network 106 (i.e., a Public Switched Telephone Network (PSTN) or the Internet). Numerous personnel 108, such as core customer representatives, implementation engineers, implementation coordinators, order distributors, etc., via devices 108a, can connect to the communications network 106 and are employed for procuring telecommunications products and/or services for the customers 102 or 104 under such flow.

Figure 2:
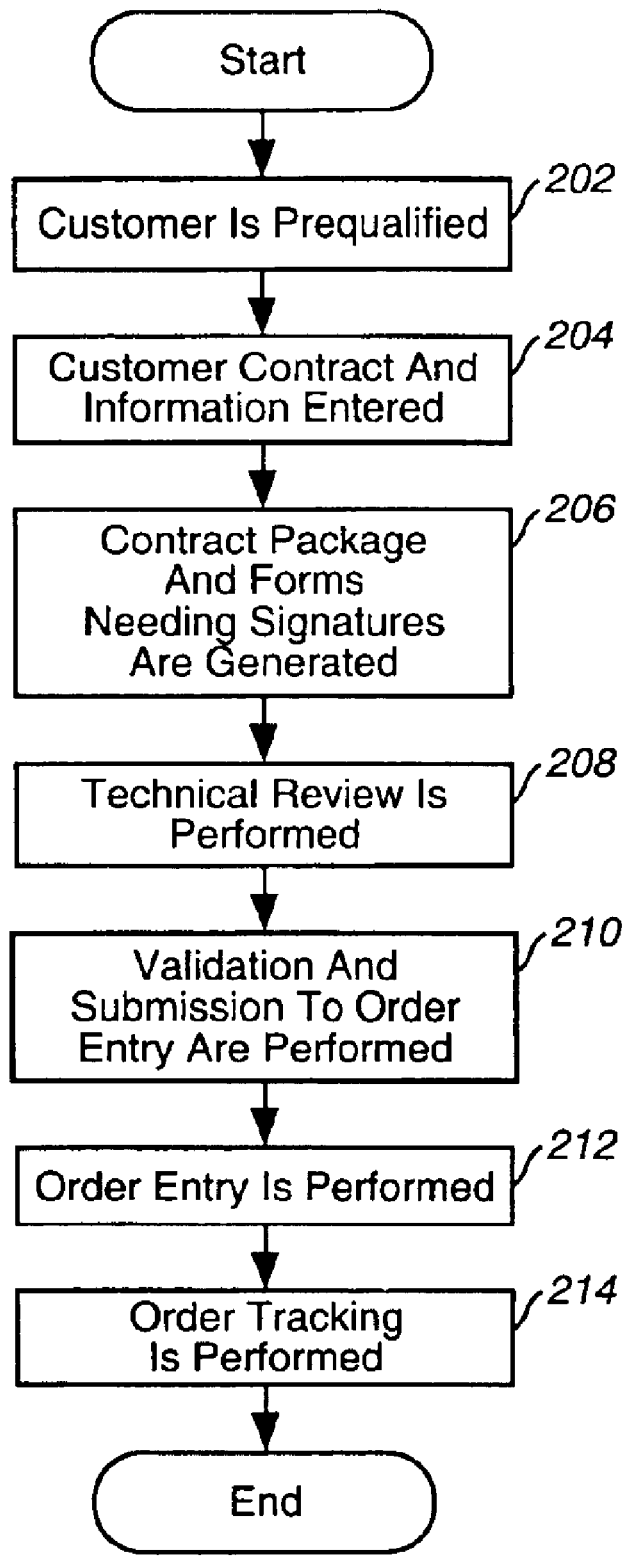
FIG. 2 is a flowchart illustrating a flow for procuring telecommunications products and/or services.

FIG. 2 is a flowchart illustrating a flow for procuring telecommunications products and/or services in the system 100. In FIG. 2, at step 202, the customer 102 or 104 is pre-qualified by a core customer representative 108 for telecommunications products and/or services desired by the customer 102 or 104. At step 204, customer contract and information are entered by the core customer representative 108. At step 206, a contract package and forms needing signatures are generated by the core customer representative 108. At step 208, an implementation engineer 208 performs a technical review of the telecommunications products and/or services desired by the customer 102 or 104. At step 210, validation and submission to order entry for the telecommunications products and/or services desired by the customer 102 or 104 are performed by an implementation coordinator 108. At step 212, order entry for the telecommunications products and/or services desired by the customer 102 or 104 is performed by the implementation coordinator, the implementation engineer and/or the order distributor 108. At step 214, order tracking is performed by the implementation coordinator 108, completing the flow for procuring telecommunications products and/or services.

Accordingly, such flow involves numerous personnel 108 and time-consuming processing steps 202–214 in order to procure telecommunications products and/or services for the customer 102 or 104. The present invention addresses the problems with such flow for procuring telecommunications products and/or services and is further described with reference to FIGS. 3–6.

Figure 3:
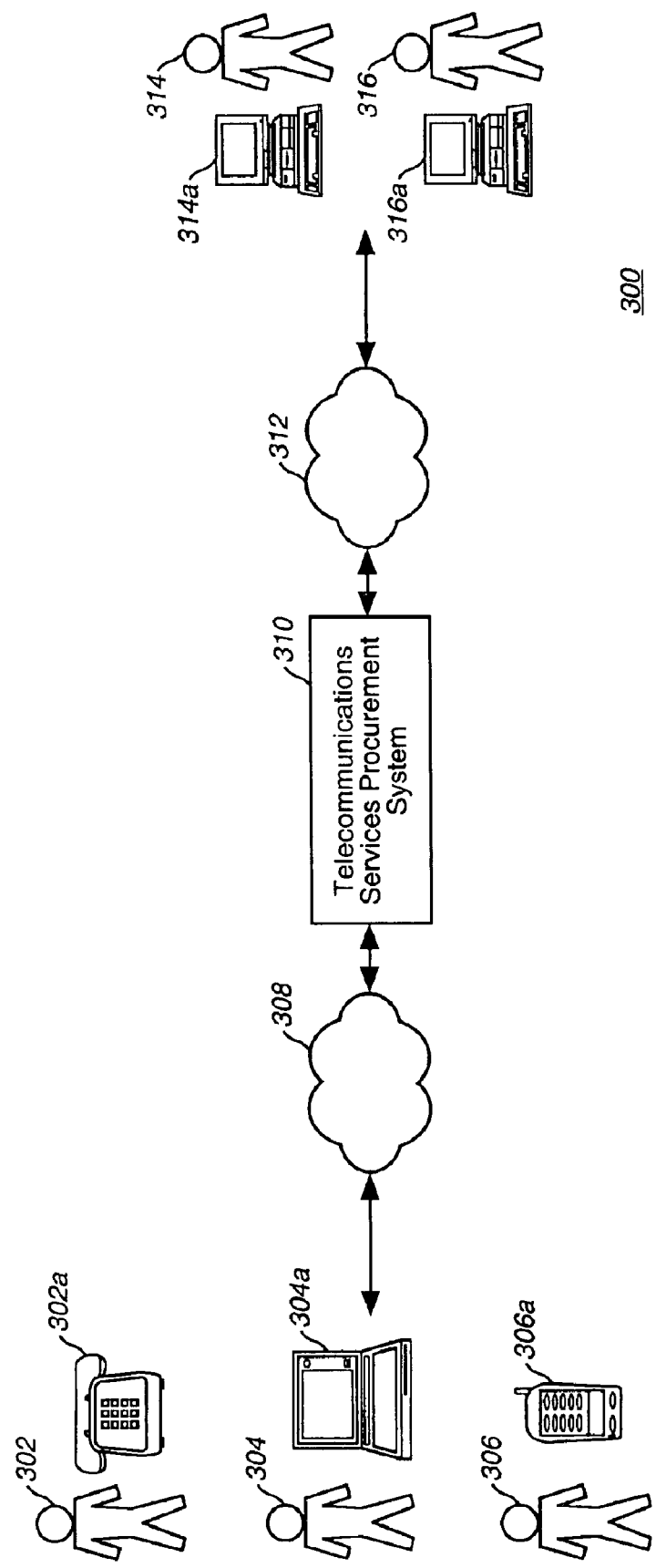
FIG. 3 is a top-level block diagram illustrating a system for procuring telecommunications products and/or services on-line.

Referring to the drawings, wherein like reference numerals designate identical or corresponding parts throughout the several views, and more particularly to FIG. 3 thereof, there is illustrated is a top level block diagram of a system 300 for procuring telecommunications products and/or services on-line, according to the present invention. In FIG. 3, the system 300 may include, for example, one or more customers 302, 304 and 306 and respective customer devices 302a, 304a and 306a (e.g., telephones, personal computers, handheld devices, etc.) for procuring telecommunications products and/or services on-line. The devices 302a, 304a and 306a may be coupled to a telecommunications service procurement system 310 via a communications network 308 (e.g., a Public Switched Telephone Network (PSTN), the Internet, an Intranet, etc.).

For devices 302a, such as conventional telephony devices, wireless telephony devices, etc., the present invention may be implemented via voice command, speech synthesis, Dual-Tone MultiFrequency (DTMF) input, etc., functions provided in the devices 302a and corresponding voice activated menu, speech recognition, DTMF detection, etc., functions provided by the telecommunications service procurement system 310 over the communications network 308 and based on the processes described in the present invention, as will be appreciated by those skilled in the relevant art(s).

For devices 304a, such personal computers, etc., the present invention may be implemented via the use of web browser, graphical user interface (GUI), etc., functions provided in the devices 304a and corresponding web server, etc., functions provided by the telecommunications service procurement system 310 over the communications network 308 and based on the processes described in the present invention, as will be appreciated by those skilled in the relevant art(s).

For devices 306a, such as personal digital assistants (PDAs), etc., the present invention may be implemented via the use of Wireless Application Protocol (WAP), Microsoft CE, Palm OS, GUI, etc., functions provided in the devices 306a and corresponding web server, etc., functions provided by the telecommunications service procurement system 310 over the communications network 308 and based on the processes described in the present invention, as will be appreciated by those skilled in the relevant art(s).

The system 300 and the telecommunications service procurement system 310 are further described in the commonly owned co-pending U.S. patent application to Felkey et al., filed herewith, entitled "METHOD AND SYSTEM FOR PROCURING TELECOMMUNICATIONS SERVICES ON-LINE," Ser. No. 10/051,282. The system 300 includes software integration, which is further described in the commonly owned co-pending U.S. patent application to Felkey et al., filed herewith, entitled "METHOD AND SYSTEM FOR PROVIDING SOFTWARE INTEGRATION FOR A TELECOMMUNICATIONS SERVICES ON-LINE PROCUREMENT SYSTEM," Ser. No. 10/051,180.

Customer service personnel 314 and/or "swivel-chair" operators 316 may access the telecommunications service procurement system 310, for example, via a back office graphical user interface (GUI) running on the devices 314a and 316a over, for example, a proprietary communications network 312 (e.g., an Intranet, a virtual private network, etc.) in order to procure telecommunications products and/or services for the customers 302, 304 or 306. The customer service personnel 314 may provide, for example, customer service functions, while the swivel-chair operators 316 may be assigned to, for example, process accepted orders, process modified orders, process supplemental orders, etc.

Similarly, the customers 302, 304 or 306 may order telecommunications products and/or services on-line via a customer GUI running on the devices 302a, 304a and 306a over the communications network 308. The back office GUI and the customer GUI are further described herein with respect to FIGS. 5–6.

In FIG. 3, the devices 302a, 304a and 306a and the respective devices 314a and 316a of the customer service personnel 314 and the swivel-chair operators 316 may communicate with the telecommunications service procurement system 310 using, for example, TCP/IP via the communications networks 308 and 312, respectively. The devices 302a, 304a and 306a and the devices 314a and 316a may include a modem function (e.g., dial-up, DSL, cable, wireless, etc.) that can log in to the telecommunications service procurement system 310 with user validation (e.g., via a personal identification number (PIN), user name and password, etc.).

The telecommunications service procurement system 310 may include all software and hardware to provide, for example, user account maintenance, validation and access control level (ACL) information, a directory server where a customer's personal information is kept, etc. The devices 302a, 304a and 306a, the devices 314a and 316a, the telecommunications service procurement system 310, etc., may be implemented using one or more of the computer system 701 of FIG. 7, for example.

Accordingly, the devices 302a, 304a and 306a, the devices 314a and 316a, the telecommunications service procurement system 310, etc., may include any suitable servers, workstations, personal computers (PCs), personal digital assistants (PDAs), Internet appliances, other devices, etc., capable of performing the processes of the present invention. The devices 302a, 304a and 306a, the devices 314a and 316a, the telecommunications service procurement system 310, etc., may communicate with each other using any suitable protocol via the communications networks 308 and 312.

It is to be understood that the system 300 in FIG. 3 is for exemplary purposes only, as many variations of the specific hardware used to implement the present invention are possible, as will be appreciated by those skilled in the relevant art(s). For example, the functionality of one or more of the devices 302a, 304a and 306a, the devices 314a and 316a, the telecommunications service procurement system 310, etc., may be implemented via one or more programmed computers or devices. To implement such variations as well as other variations, a single computer (e.g., the computer system 701 of FIG. 7) may be programmed to perform the functions performed by, for example, the devices 314a and 316a shown in FIG. 3. On the other hand, two or more programmed computers or devices, for example as in shown FIG. 7, may be substituted for any one of the devices 302a, 304a and 306a, the devices 314a and 316a, the telecommunications service procurement system 310, etc., of FIG. 3. Principles and advantages of distributed processing, such as redundancy, replication, etc., may also be implemented as desired to increase the robustness and performance of the system 300, for example.

The communications networks 308 and 312 may be implemented via one or more communications networks (e.g., the Internet, an Intranet, a wireless communications network, a satellite communications network, a cellular communications network, a Public Switched Telephone Network (PSTN), a hybrid network, etc.), as will be appreciated by those skilled in the relevant art(s). In a preferred embodiment of the present invention, the communications networks 308 and 312 may employ electrical, electromagnetic, optical signals, etc., that carry digital data streams, as are further described with respect to FIG. 7.

Figure 4:
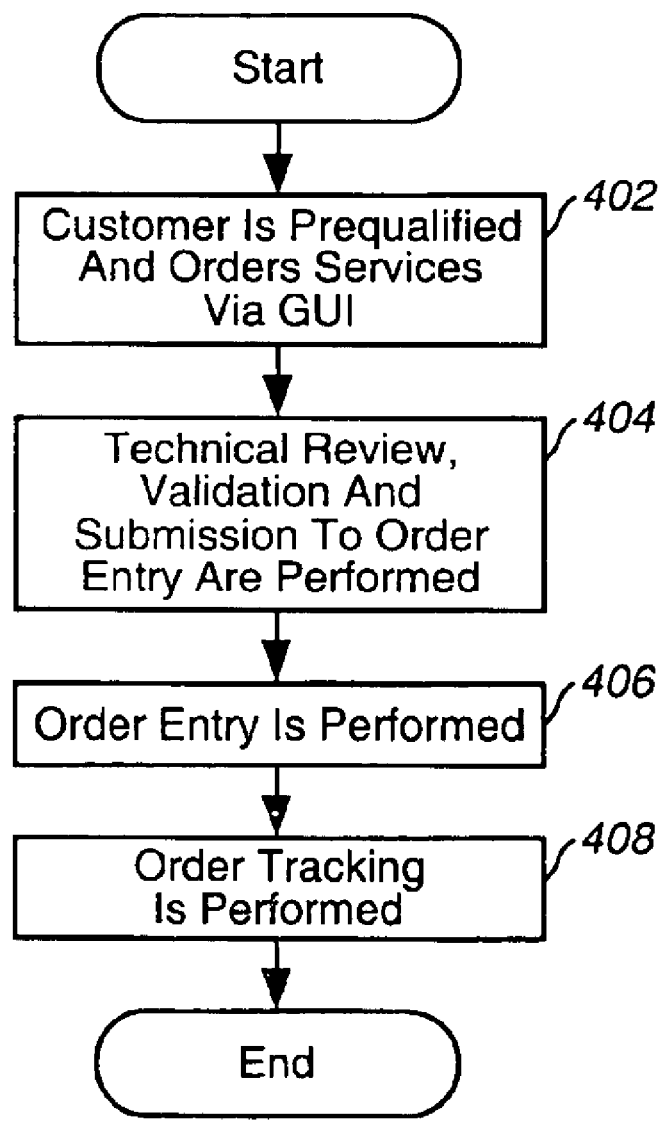
FIG. 4 is a flowchart illustrating a flow for procuring telecommunications products and/or services on-line.

FIG. 4 is a flowchart illustrating a flow for procuring telecommunications products and/or services on-line, according to the present invention. In FIG. 4, at step 402, the customer 302, 304 or 306 is pre-qualified and orders telecommunications products and/or services via the customer GUI. At step 404, technical review, validation and submission to order entry are performed by a service coordinator (e.g., customer service personnel 314, swivel-chair operators 316, etc.). At step 406, order entry for the telecommunications products and/or services desired by the customer 302, 304 or 306 is performed by the service coordinator. At step 408, order tracking is performed by the service coordinator, completing the flow for procuring telecommunications products and/or services, according to the present invention.

Accordingly, the flow for procuring telecommunications products and/or services, according to the present invention, does not involve numerous personnel 108 or time-consuming processing steps 202–210, in order to procure telecommunications products and/or services for a customer, as compared to the flow of FIGS. 1 and 2. Thus, the present invention addresses the noted problems with flow for procuring telecommunications products and/or services.

The graphical user interface for procuring telecommunications products on-line may now be described with reference to FIGS. 5–6.

Figure 5A:
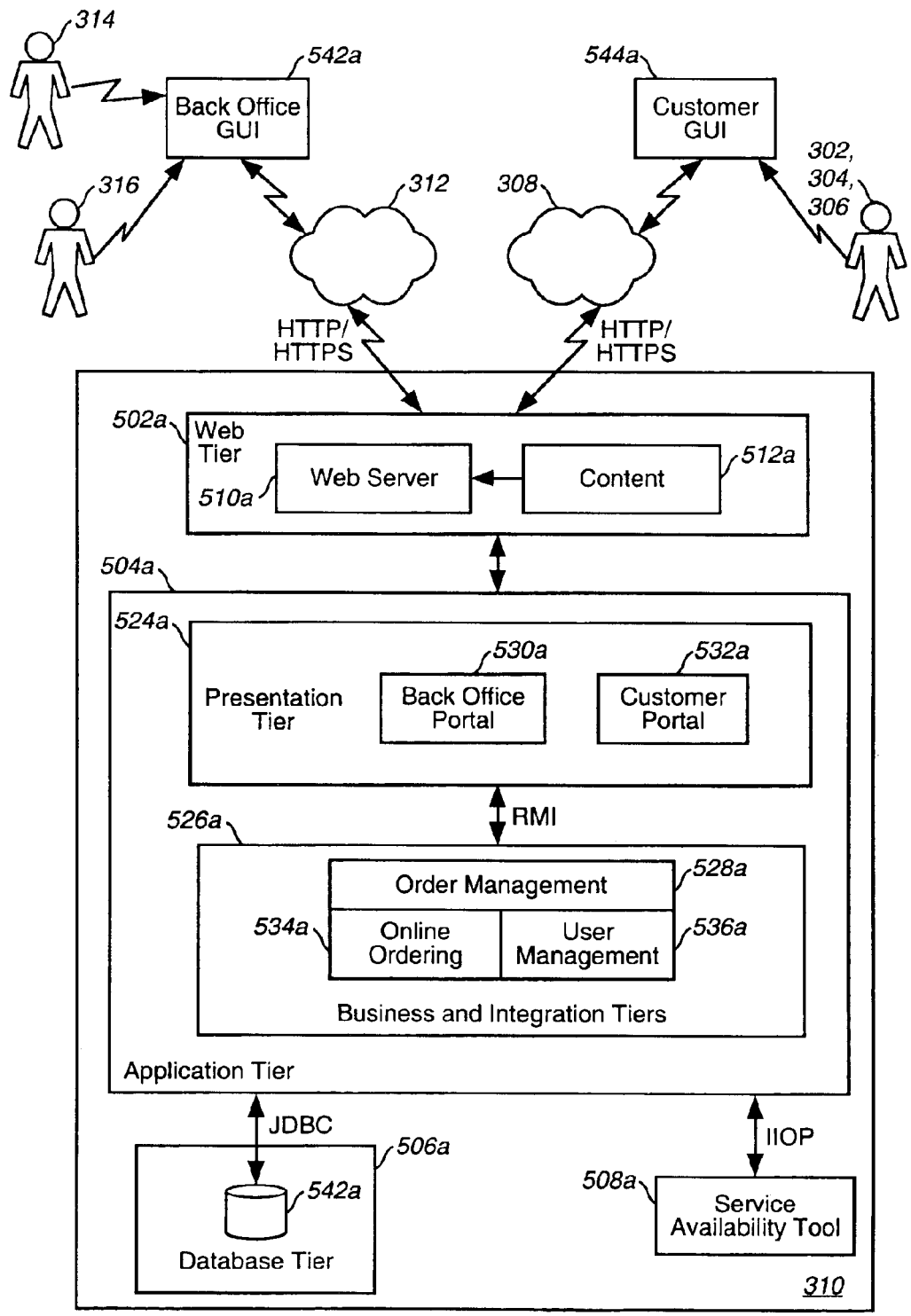
FIG. 5a is a top level block diagram illustrating a logical architecture employed in the system for a graphical user interface for procuring telecommunications products on-line.

FIG. 5a is a top level block diagram illustrating a logical architecture employed in the system 310 for a customer graphical user interface for procuring telecommunications products on-line, according to the present invention. In FIG. 5a, the logical architecture includes a web tier 502a, an application tier 504a, a database tier 506a and a service availability tool (SAT) 508a. The application tier 504a communicates with the database tier 506a using, for example, Java DataBase Connectivity (JDBC). The application tier 504a communicates with the SAT 508a using, for example Internet Inter-ORB Protocol (IIOP).

The web tier 502a is responsible for delivering web content 512a (e.g., HyperText Markup Language (HTML) pages, static content, images, Javascript scripts and cascading style sheets, etc) to the client machines 302a, 304a and 306a and 314a and 316a of FIG. 3. A customer graphical user interface (GUI) 544a is provided for the client machines 302a, 304a and 306a over the communications network 308 as described herein. A back office graphical user interface (GUI) 544a is provided for the client machines 314a and 316a over the communications network 312 as described herein. The swivel chair 316 and the customer service 314 personnel can perform swivel chair/back office functions via the back office GUI 542a.

The client machines 302a, 304a and 306a and 314a and 316a running a web browser (e.g., Internet Explorer, Netscape, etc.) and via the respective GUIs 544a and 542a connect requested web pages and images from the web site via, for example, HyperText Transport Protocol (HTTP) and HyperText Transport Protocol Secure (HTTPS). Although lower layers generate the system's HTML pages, the web tier 502a manages the building blocks of the HTML pages (e.g., the content 512a, etc.). The HTTP and HTTPS requests are passed to a web server 510a. The web server 510a serves up requests that it can fulfill and forwards user actions and HTML requests to a presentation tier 524a.

The application tier 504a includes the presentation tier 524a framework (e.g., Cygent's presentation tier framework, etc.). Functionality from the presentation tier 524a framework (e.g., Cygent's Small Business Portal, etc.) is leveraged to build a customer portal 532a. This is achieved by reusing and/or configuring the existing JavaServer Pages (JSPs) and objects including transition and display policies of the presentation tier framework 524a.

A back office portal 530a, on the other hand, is custom constructed, but designed with the presentation tier 524a framework (e.g., the Cygent framework, etc.) in mind. In other words, the pages are named in a consistent manner with the rest of the portals, and the same is true for the transition policies and display policies and objects.

The application tier 504a includes a business and integration tier 526a (e.g., Cygent's Business tier and Integration tier, etc.). The business and integration tier 526a is a home for various components, such as activity and domain objects of three functional areas included therein: order management 528a, online ordering 534a and user management 536a. In FIG. 5a, communications messaging interfaces (CMIs) and handlers are included in the business and integration tier 526a. The business and integration tier 526a communicate with the presentation tier 524a using, for example, Remote Method Invocation (RMI).

Domain objects to handle the ordering functionality (e.g., Cygent's ordering functionality domain objects, etc.) were extended and a custom CMI and pricing adapter as an extension to a pricing scheme (e.g., Cygent's pricing scheme, etc.) were designed. Activity objects also referred to as managers or controllers (e.g., Cygent managers or controllers, etc.) are used to coordinate the ordering activities and functions. Business rules (e.g., Cygent, etc.) to constrain the ordering activities as needed are also employed. Existing database 542a tables (e.g., Cygent, etc.) are used to persist online ordering data. Additional tables are designed to extend such schema. Such tables are also mapped to display objects and domain objects (e.g., using a TopLink for Java tool, etc.).

Pre-qualifying a customer 302, 304 or 306 for products and/or services employs an application to make a call out to the SAT 508a, which is, for example, Common Object Request Broker Architecture (CORBA) based. A custom CMI and adapter was designed to handle that function.

The system hardware and software are further described in the commonly owned co-pending U.S. patent applications to Felkey et al., filed herewith, entitled "METHOD AND SYSTEM FOR PROVIDING SOFTWARE INTEGRATION FOR A TELECOMMUNICATIONS SERVICES ON-LINE PROCUREMENT SYSTEM," Ser. No. 10/051, 180, "METHOD AND SYSTEM FOR PROCURING TELECOMMUNICATIONS SERVICES ON-LINE," Ser. No. 10/051,282.

The web site of the present invention allows businesses to, for example, research telecommunications products and/or services, obtain price quotes, order those products and services, track order status, receive monthly statements, manage their account at any time, etc. The web site also allows the web site's customer support team members (e.g., the customer support 314 and swivel chair operator 316 personnel, etc.) to retrieve and process orders, track and update status, and interactively assists customers 302, 304 and 306.

This following description describes such features, functions and processes of the present invention. The web site home page is a customer-facing avenue to various services. Once registered, a customer can take full advantage of the many features. Such as, browsing products to learning about the many services on the web site.

Figure 5B:
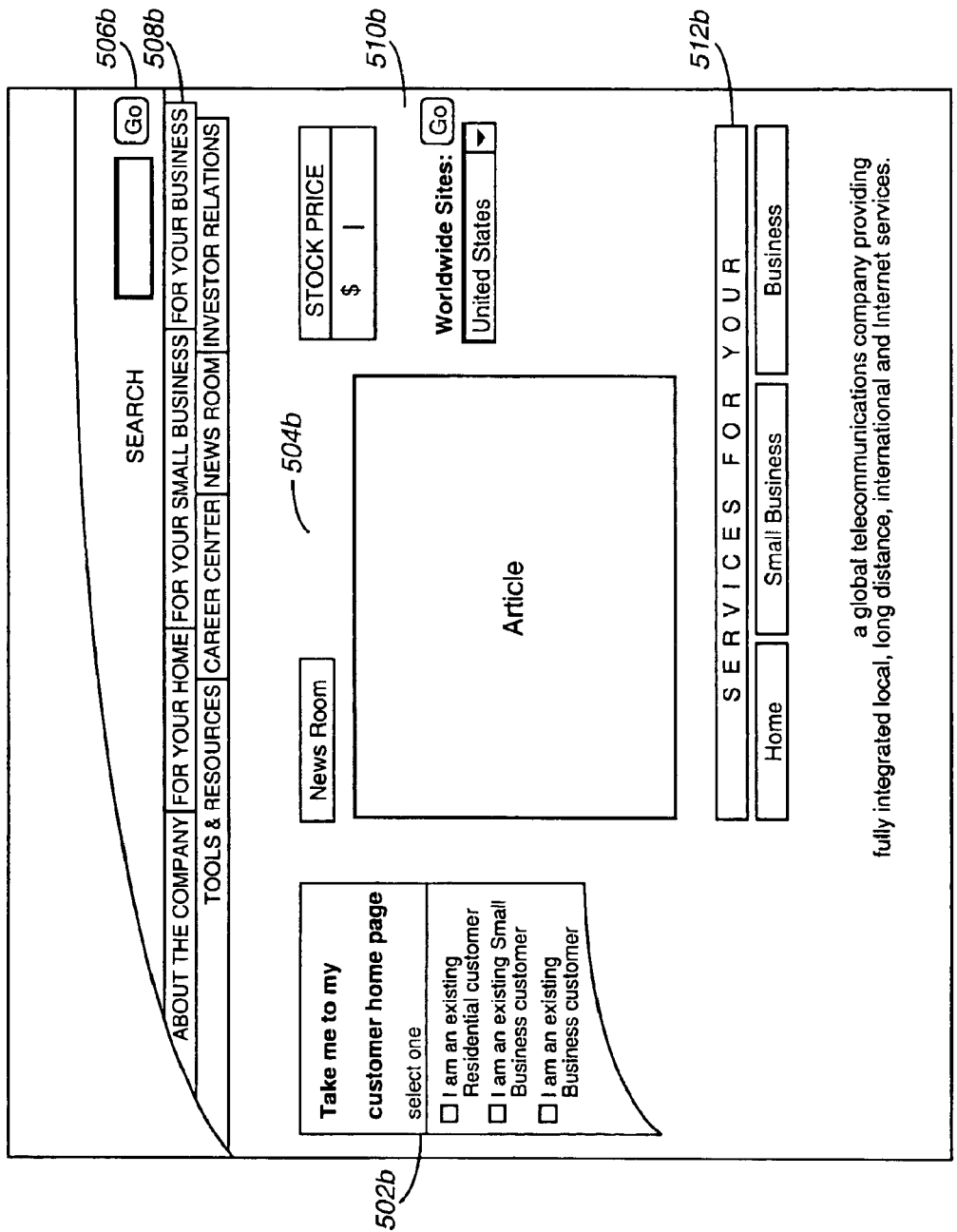
FIGS. 5b–5c are exemplary screen shots illustrating a customer graphical user interface for procuring telecommunications products on-line.

FIG. 5b is an exemplary screen shot illustrating the customer graphical user interface (GUI) 544a of the web site including, for example, links 502b to residential, business and small business customer home pages. A search field and button 506b is provided for searching the web site or the Internet. Links 508b and 512b include, for example, links to information about the web site, information for telecommunications products and service for residential, business and small business customers, tools and resources, career opportunities, news articles, investor relations, etc., which may be displayed in section 504b. Stock prices and worldwide site information may be provided in section 510b.

Figure 5C:
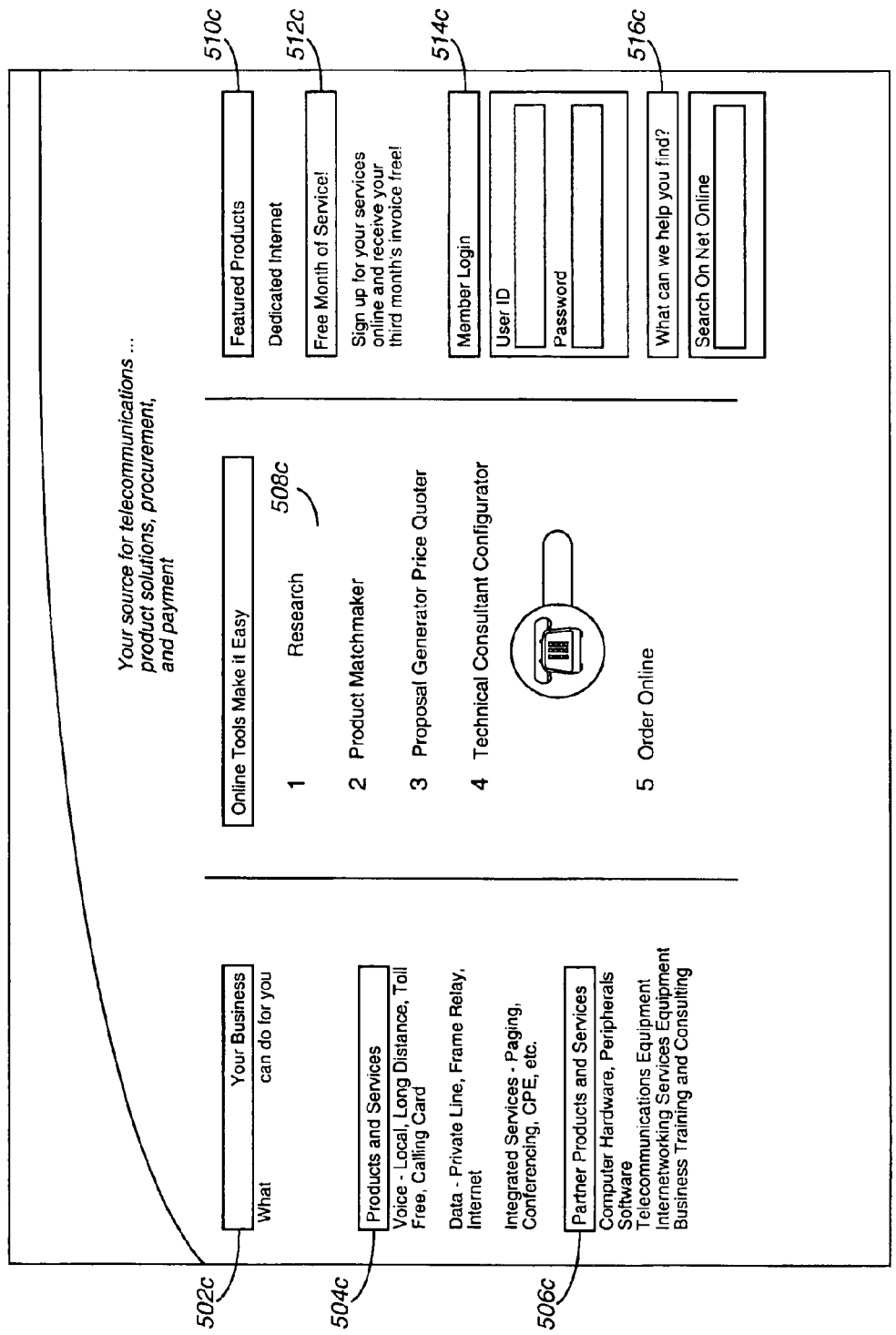

FIG. 5c is an exemplary screen shot illustrating another page of the customer GUI 544a including, for example, links 502c to information about what the web site can do for customers, links 504c for providing information about the telecommunications products and services provided by the web site, on-line tools 508c, such a tool for researching telecommunications products and service, a product match maker tool, a proposal or quote generator tool, a technical consultant tool, such as on-line chat, instant messaging, etc., an on-line ordering tool, etc.

Also provide are, for example, a link 510c for accessing information about featured products and/or services, a link 512c for accessing information about special offers, member's login section 514c, a search area 516c, etc.

Figure 5D:
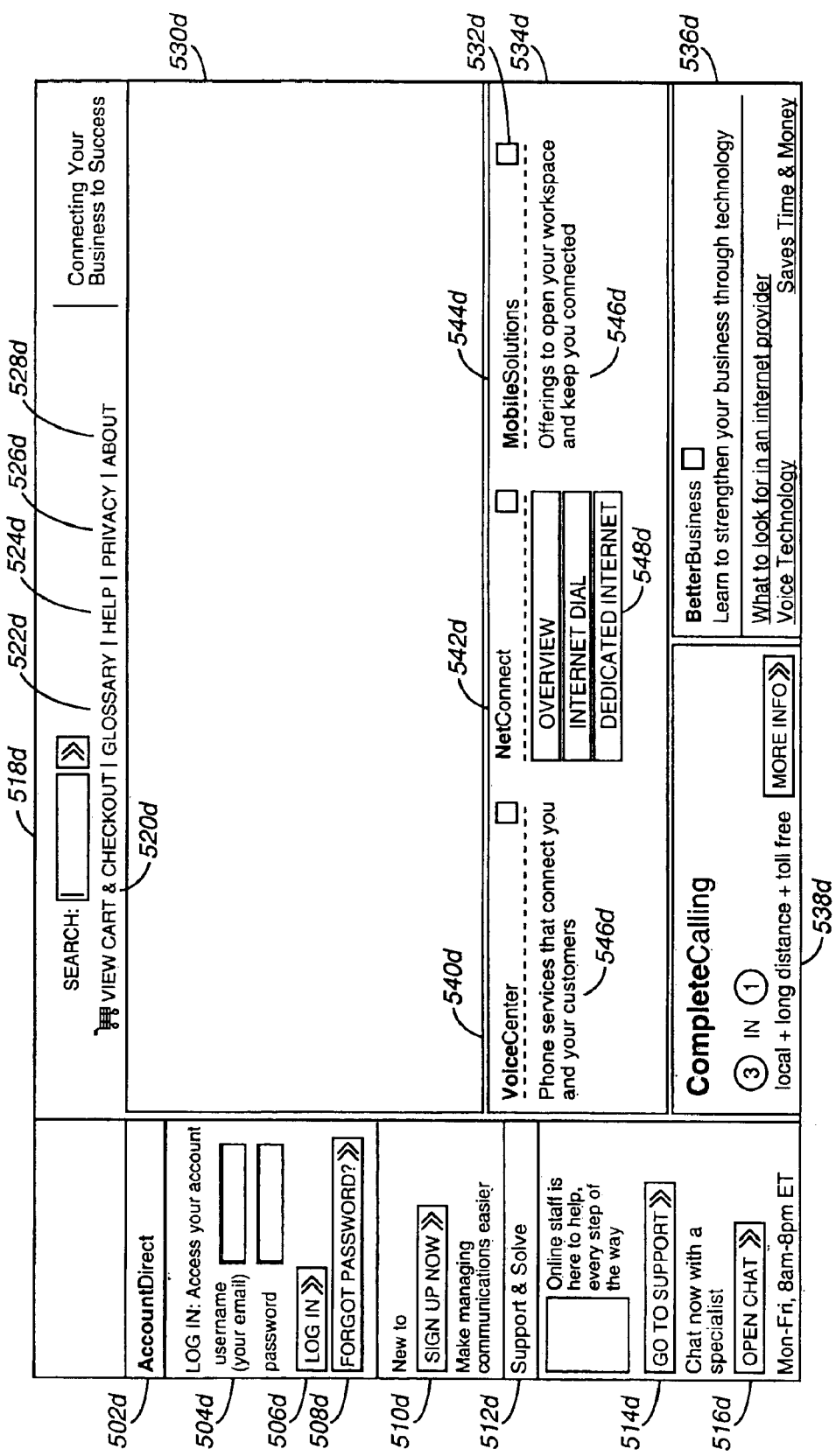
FIGS. 5d–5r are exemplary screen shots illustrating a customer graphical user interface for procuring telecommunications products on-line.

FIG. 5d is an exemplary screen shot illustrating the customer GUI 544a including, for example, a customer account section 502d for logging in using a user name and password 504d via a "log in" button 506d. A "forgot password" button 508d is provided for existing customers for generating an e-mail to the customer with password information. A "sign up now" link 510d is provided for new customers.

The GUI 544d also includes, for example, a support section 512d with links 514d to customer support, links 516d for real time chat or instant messaging with customer support personnel, etc., a search section 518d, links to shopping cart and checkout functions 520d, an on-line glossary 522d, on-line help 524d, privacy information 526d, information about the web site 528, etc. Also provide are, for example, a section 530d for graphic illustrations, a products and services section 532d including, voice 540d, Internet 542d, mobile telecommunications 544d, etc., products and services, a product category description section 534d with high level product description 546d, dropdown menus 548d for the respective products, etc. Links 566d, for example, to pertinent articles 536d, featured products and/or services 538d, etc., also are provided.

Figure 5E:
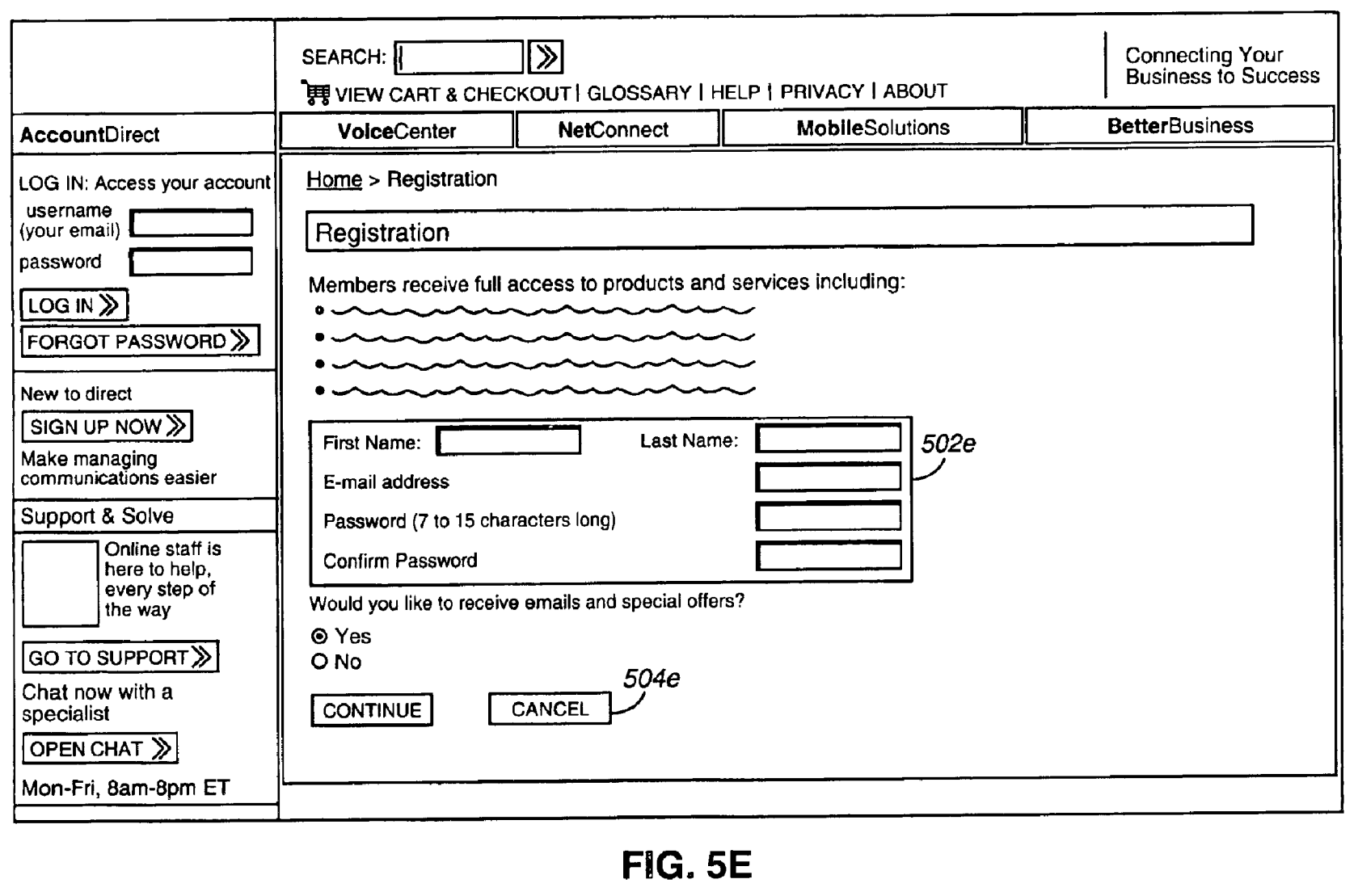

Registering on the web site requires a minimal amount of information. Once registered, a customer may log in whenever they visit the site to access full site functionality. To register, a customer clicks on the "sign up now" button 510d and an exemplary registration page shown in FIG. 5e is displayed. The customer enters the noted information 502e and clicks on "continue" or "cancel" buttons 504e. A confirmation page displays.

FIG. 5f is an exemplary screen shot illustrating of the web site page for a logged in customer. To log out of a customer session, the customer clicks on the "log out" button 502f.

The web site page for the logged in customer also includes, for example, an "account review" link 504f, a "saved product info" link 506f, an "invite colleagues" link 508f, a "notification list" link 510f, an "edit profile link" 512f, etc.

Figure 5G:

Once registered and in future visits, a customer may save their shopping cart from session to session, track and manage services, etc. If the customer wishes to edit his/her profile, he/she clicks the "edit profile" button 512f and the exemplary registration screen shown in FIG. 5g is generated. In the registration screen the customer enters customer profile information 502g (e.g., first name, last name, etc.) and 506g (e.g., password, password confirmation, etc.), clicks on the "submit changes" or "cancel" buttons 504g and a confirmation page displays.

As a registered and logged in customer, the customer, for example, can order the web site products and services and save the details of his/her order for future decisions via the shopping cart function 520d. The web site glossary 522d allows a customer look up technical terms and unfamiliar words. The keyword search function 518d is available to help locate items. Using quotes around terms with "and" therebetween may be used to refine a search. In this case, the search engine searches, for example, the pages that contain both or all of the keywords entered. Using quotes around terms with "or" therebetween may be used to expand a search. In such a case, the search engine will search for pages containing any of the keywords entered.

There are a variety of telecommunications products and/or services that may be reviewed on the web site. To browse any of the web site's suites of products and services, a customer links to the product information 532d by the category 540d, 542d, 544d, etc., of the product desired. The products may be categorized, for example, in three areas 540d, 542d and 544d each including an overview of the product offering. For example, a "voice center" category 540d may include "complete calling," "long distance," "toll free," "conferencing," "calling card," etc., products and/or services, a "net connect" category 542d may include "dial up Internet," "dedicated Internet" etc., products and/or services, a "mobile solutions" category 544d may include "paging," "conferencing," "calling card," "dial up," etc., products and/or services, etc.

For information and review of a particular product or service, for example, in the "net connect" category 542d, the customer clicks on the "net connect" category 542d and the dropdown list 548d of the various products in the "net connect" category 542d appears. Clicking on "overview" in the dropdown list 548d provides additional product information. Clicking on the product and/or service in the dropdown list 548d results in product and/or service information for the selected product appearing. Clicking on a "learn more" button provides additional price and product information.

Figure 5H:
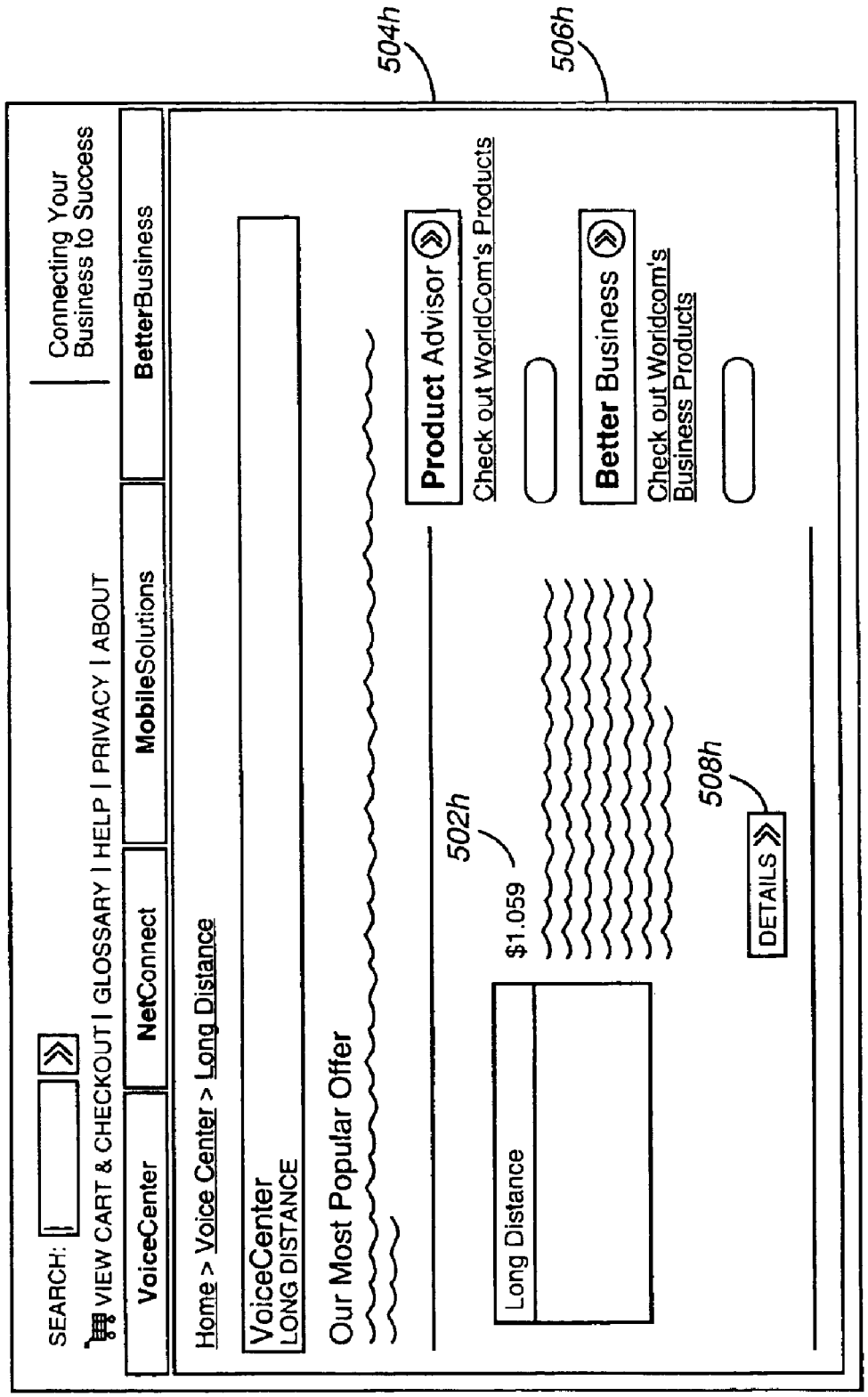
Figure 5I:
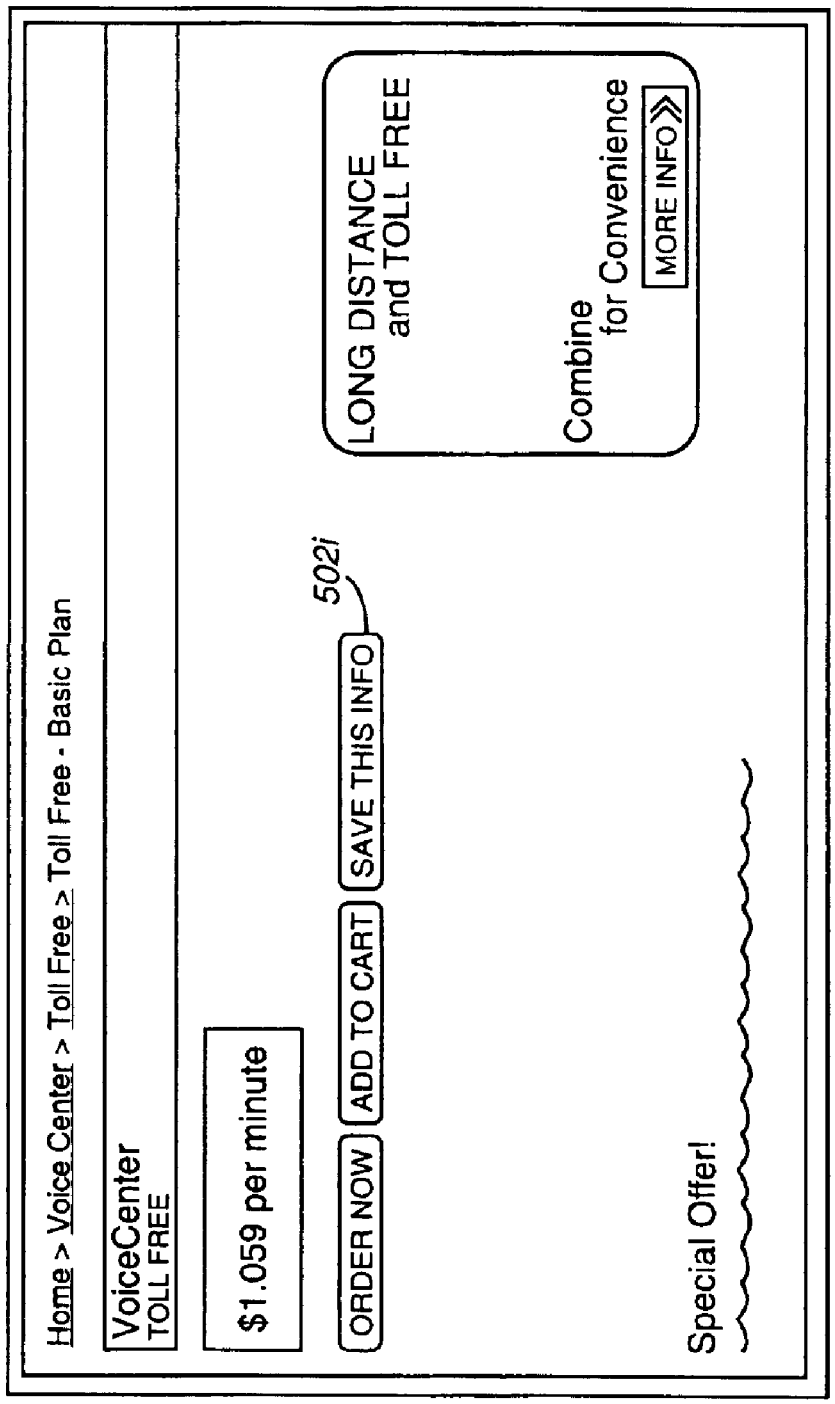
Figure 5K:
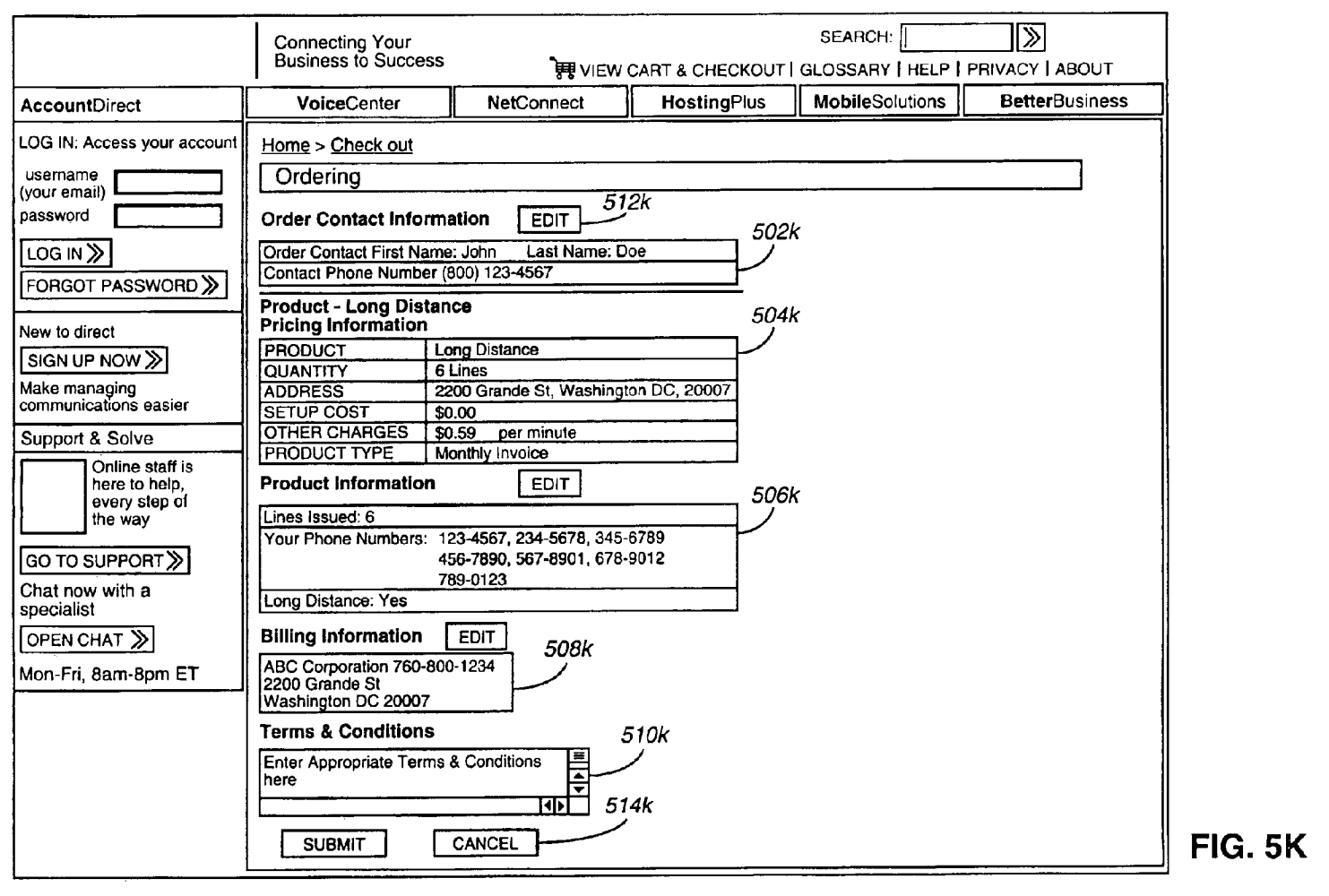
Figure 5L:
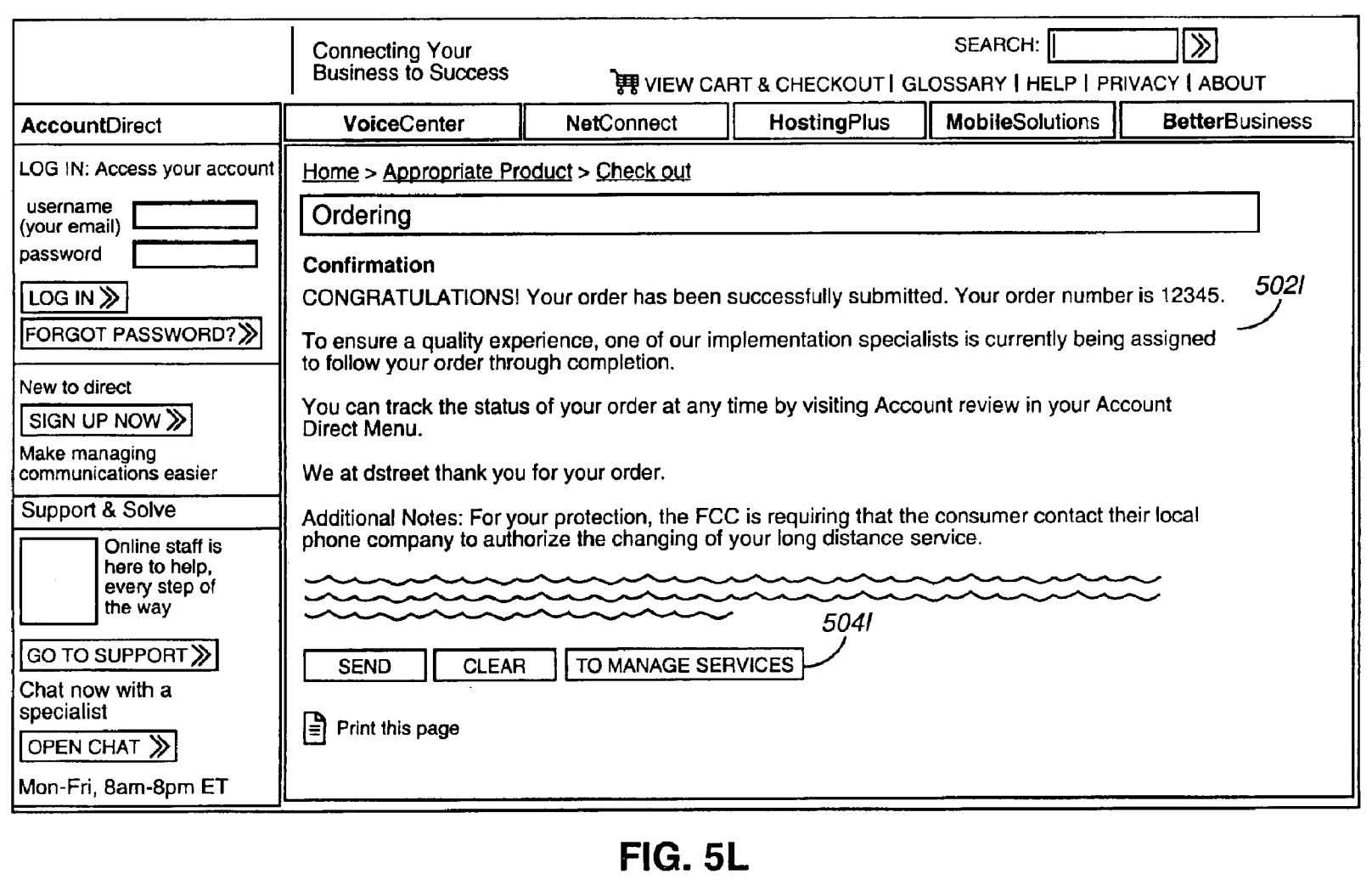
Figure 5N:
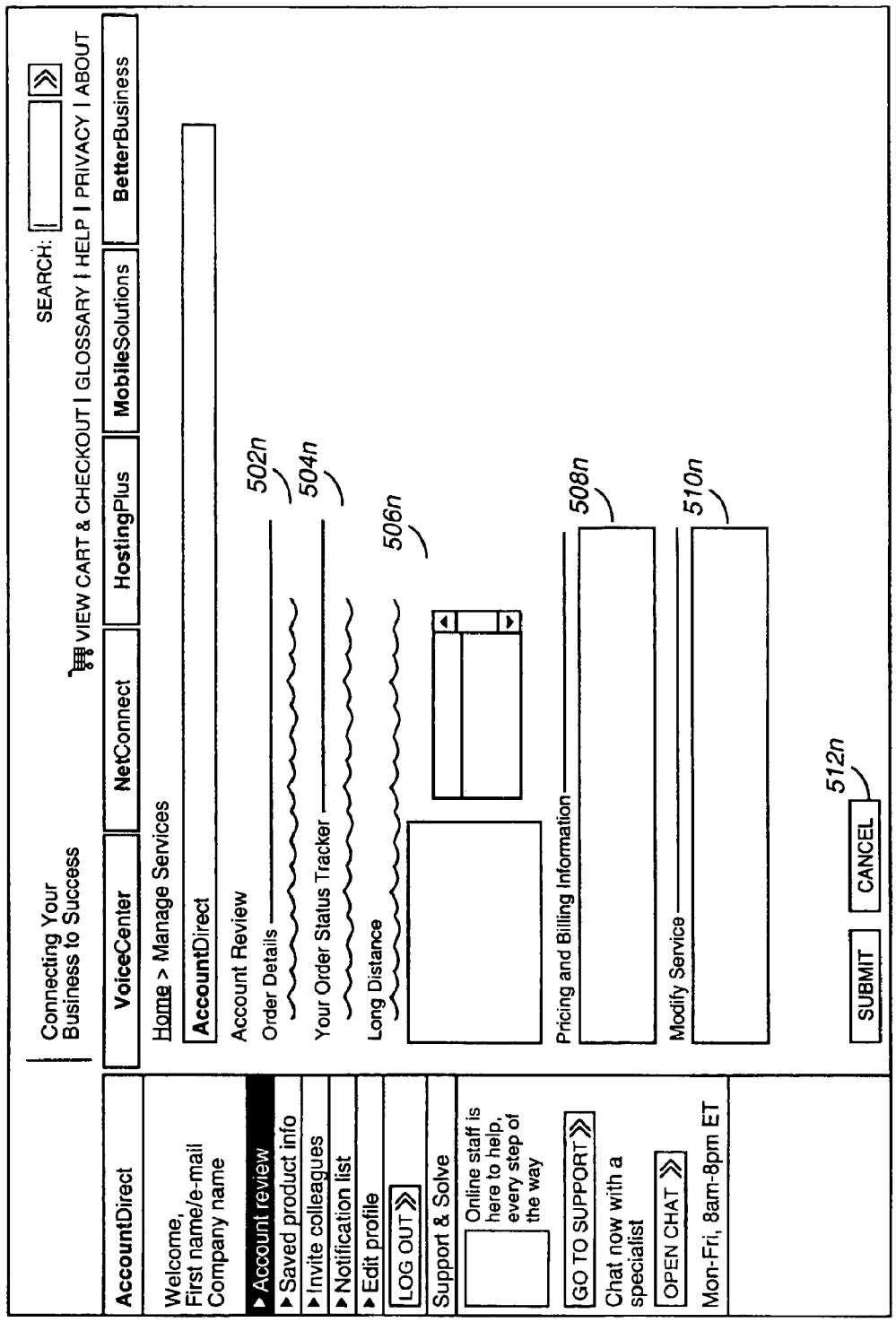
Figure 50:
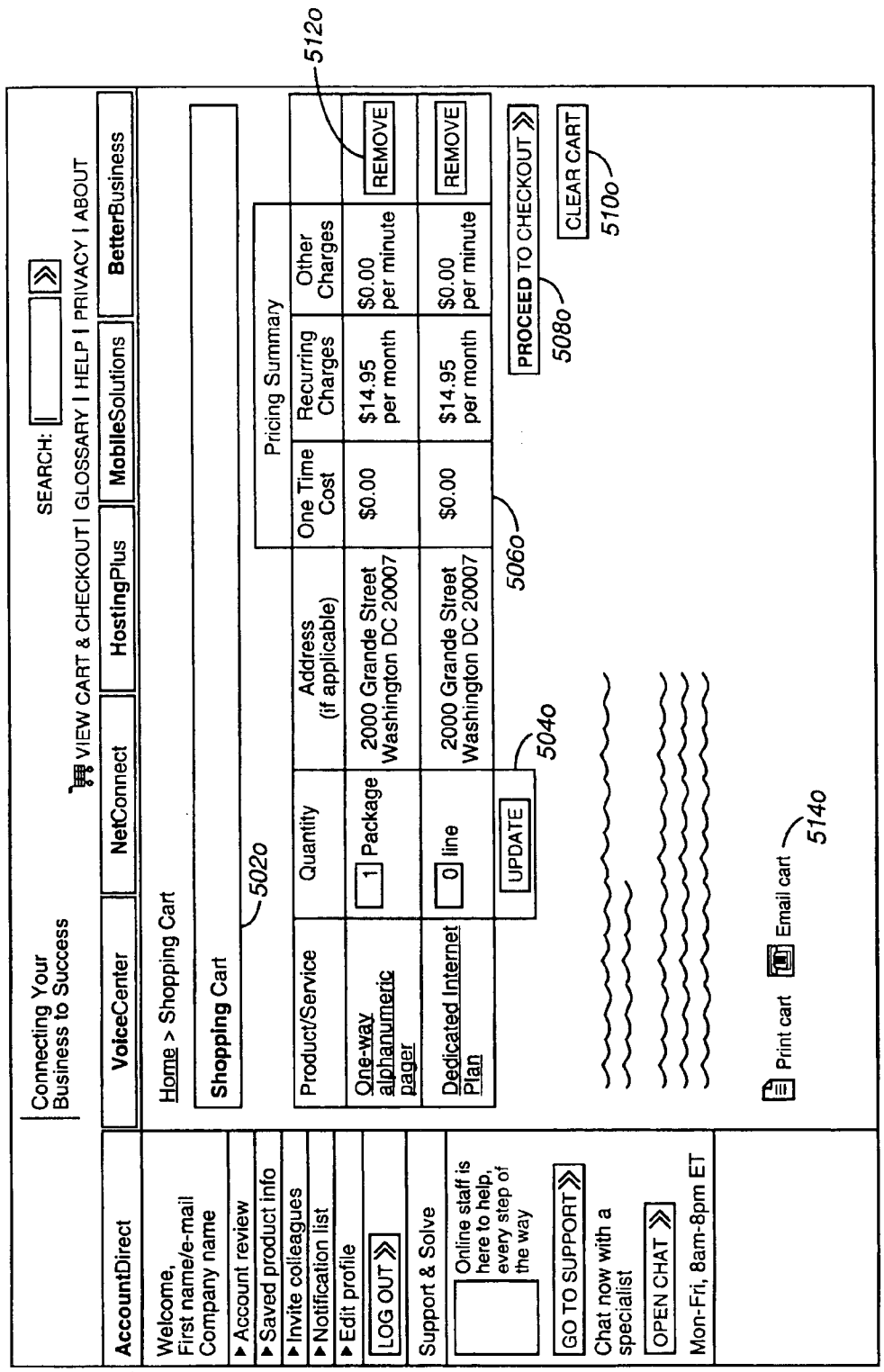

A product quote may be obtained by navigating down into the product and/or service desired. For example, if a customer wishes to obtain a quote for "long distance" under the "voice center" category 540d, the customer clicks on the "voice center" category 540d and a list of products 548d is generated. The customer then selects "long distance" from the list 548d and clicks on "save this info" to save a quote. The customer may click on the "saved product info"button 506f to run the quote at a later time. FIG. 5h is an exemplary screen shot of a product quote page, for example, including, product or service information 502h, a "product advisor" button 504h, a related articles button 506h, a product "details" button 508h, etc. As shown in FIG. 5i, the product quote page may include, for example, "order now," "add to cart," "save this info," etc., buttons 502i.

Typically orders are entered on-line directly by the customer. The customer inquires for a quote in the web site, saves it to a shopping cart, accepts the "terms and conditions" to see a shopping cart summary, supplies billing and credit information and finally clicks on a "submit" button to submit the shopping cart information. This causes the web site system, for example, to convert the shopping cart information into an order, add tracking information, send notification to the web site's in-house credit department, send a notification message to the customer, initialize the order to prompt the back office for operational support system (OSS) application (e.g., OrderPro, etc.) processing, etc.

In the above processing, clicking on the "order now" button 502i of the product quote page of FIG. 5i displays the exemplary product order registration form shown in FIG. 5j. Existing customers then enter their user name and password 504j and click on the "continue" button 506j an exemplary product order form of FIG. 5k is displayed. New customers are referred to section 508j and click on the "continue" button 510j to start the registration process. It is noted that, advantageously, a new customer does not have to register on the web site until he/she is ready to purchase products and/or services in order to not turn away potential customers not wishing to have to register as a precondition to shopping on-line.

The order process then involves the customer completing all information on a product order form, clicking on a "continue" button at which point a billing page displays. If previous orders have been placed on the web site customer information is automatically populated. The customer then selects a payment method from a dropdown list and clicks on a "continue" button and an exemplary order review page shown in FIG. 5k displays.

The customer may then review the order detail and click on "submit" or "cancel" buttons 514k. When the order is submitted, an order confirmation page displays. A copy of the confirmation page can be printed by clicking on "Print" button. The order review page of FIG. 5k includes, for example, an accept terms and conditions section 510k, order contact information 502k, product information 506k, product pricing information 504k, billing information 508k, etc., which may be edited via respective "edit" buttons 512k. After the customer is finished reviewing the order page he/she clicks on the "submit" button 514k and an exemplary order confirmation page shown in FIG. 5l displays and the order is submitted. The order confirmation page may include, for example, a confirmation notice 502l and "send," "clear" and "to manage services" buttons 504l.

To review order status, a customer clicks on the "account review" button 504f and an exemplary account review page of FIG. 5m displays. This page provides details on all orders processed to the account. To obtain further details on an order, the customer clicks on a "details" link 508m for a respective order in the order summary section 506m and an exemplary order status and details screen of FIG. 5n displays. The order status and details screen may include, for example, a message section 502n, a status tracker 504n (e.g., showing steps completed in the order, etc.), service details 506n, pricing and billing information 508n, a modify service section 510n (e.g., move, change, other service, etc.), "submit" and "cancel" buttons 512n, etc.

An "MCD" operation is defined in the web site as a Move, Change or Disconnection of an order after the order has been entered into the OSS order application (e.g., OrderPro, etc.) and fulfilled. An MCD is a service change request. To enter an MCD a customer choose the action to be performed, for example, "move," "change," "disconnect," etc., from the modify service section 510n. The customer then enters information about the MCD requests (e.g., contact information, etc.) and clicks on the "submit" or "cancel" buttons 512n. A confirmation page displays.

The shopping cart may be triggered when "add to cart" button is selected displaying an exemplary shopping cart page shown in FIG. 5o. Once a product is in the shopping cart a customer may change the product quantity in section 506o, remove an item from the cart via "remove" via buttons 512o, update the order via an "update" button 504o, clear the entire cart via a "clear cart" button 510o, obtain further product details by clicking on a product in the section 506o, print the cart, e-mail the cart, proceed to checkout via button 508o, etc.

Figure 5P:
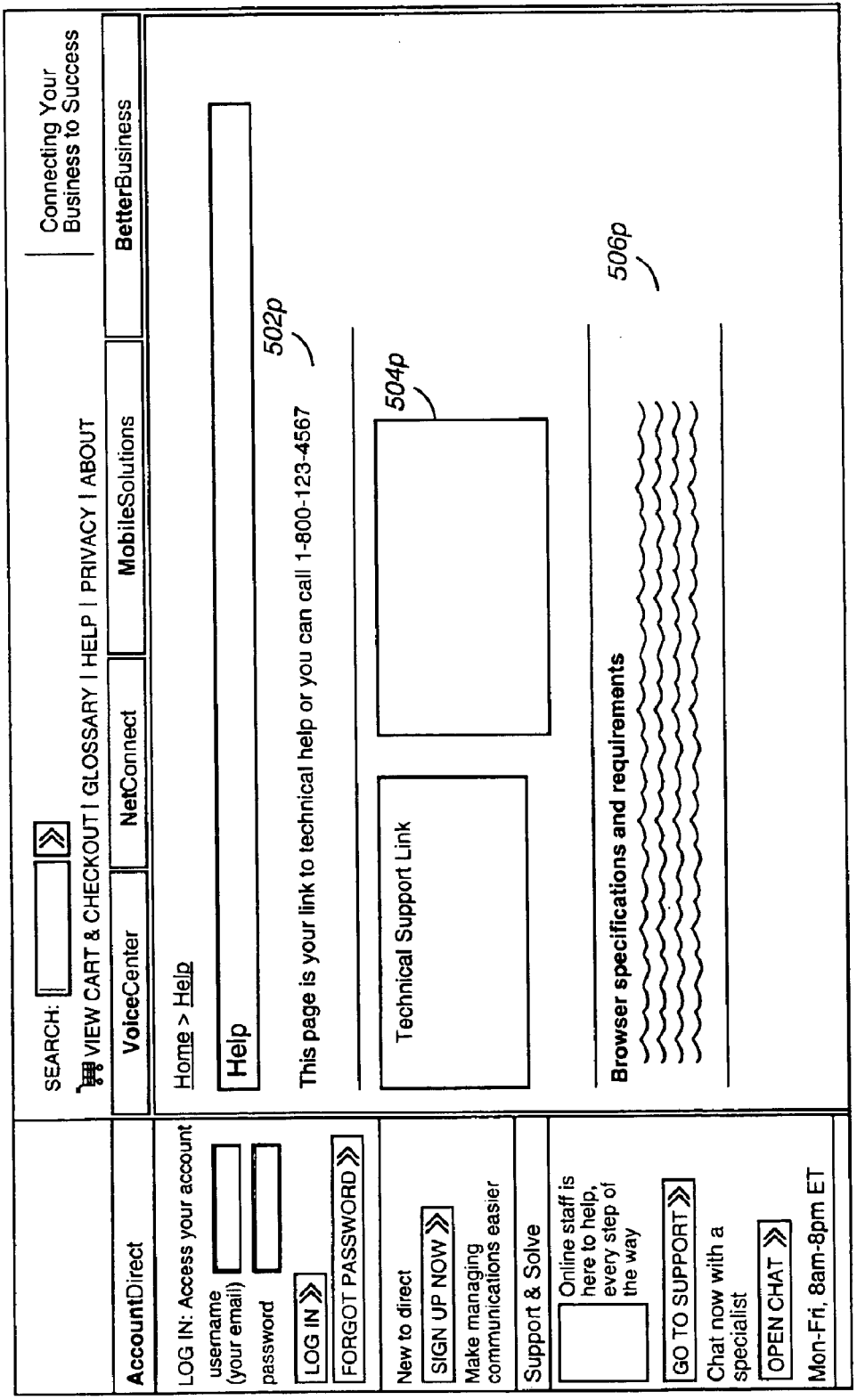

A customer may obtain technical support by navigating to the technical support page on the web site by clicking on the "help" button 524d. An exemplary help page with a help message 502p as shown in FIG. 5p displays. The customer then navigates to a "technical support" link on a section 504p of the help page. From this link the information (e.g., browser specifications and requirements, cookies, spawning windows, bookmarks, etc.) can be obtained and displayed in sections 506p.

Figure 5Q:
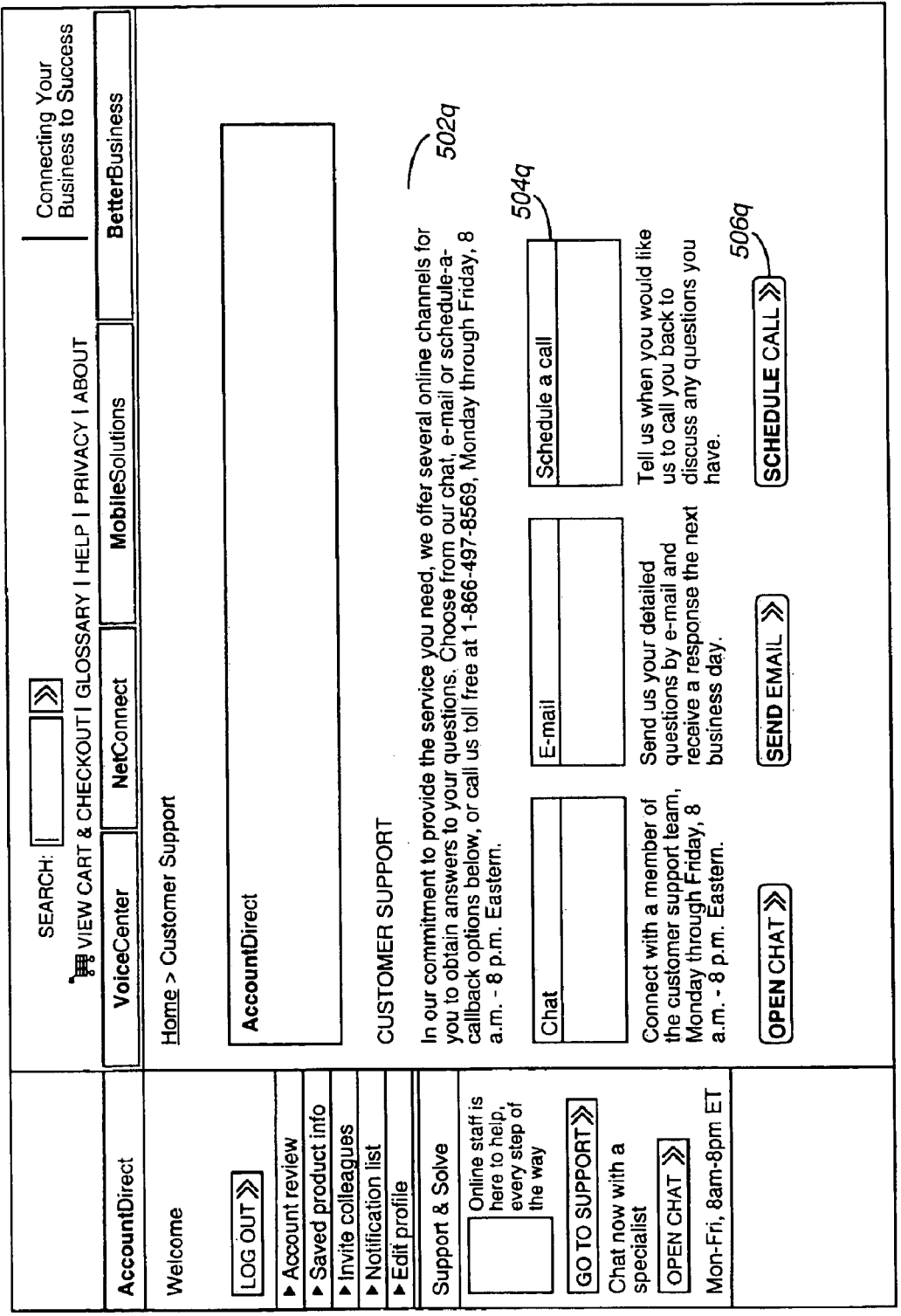

Questions and help assistance with all products or the order process can be obtained by using the "support and solve link" 512d to display an exemplary help page shown in FIG. 5q. The customer then may click on a "chat," "e-mail," "schedule a call," etc., buttons 506q" in section 504q to perform a requested with the customer support team (e.g., the customer support 314 and swivel chair operator 316 personnel, etc.).

Figure 5R:
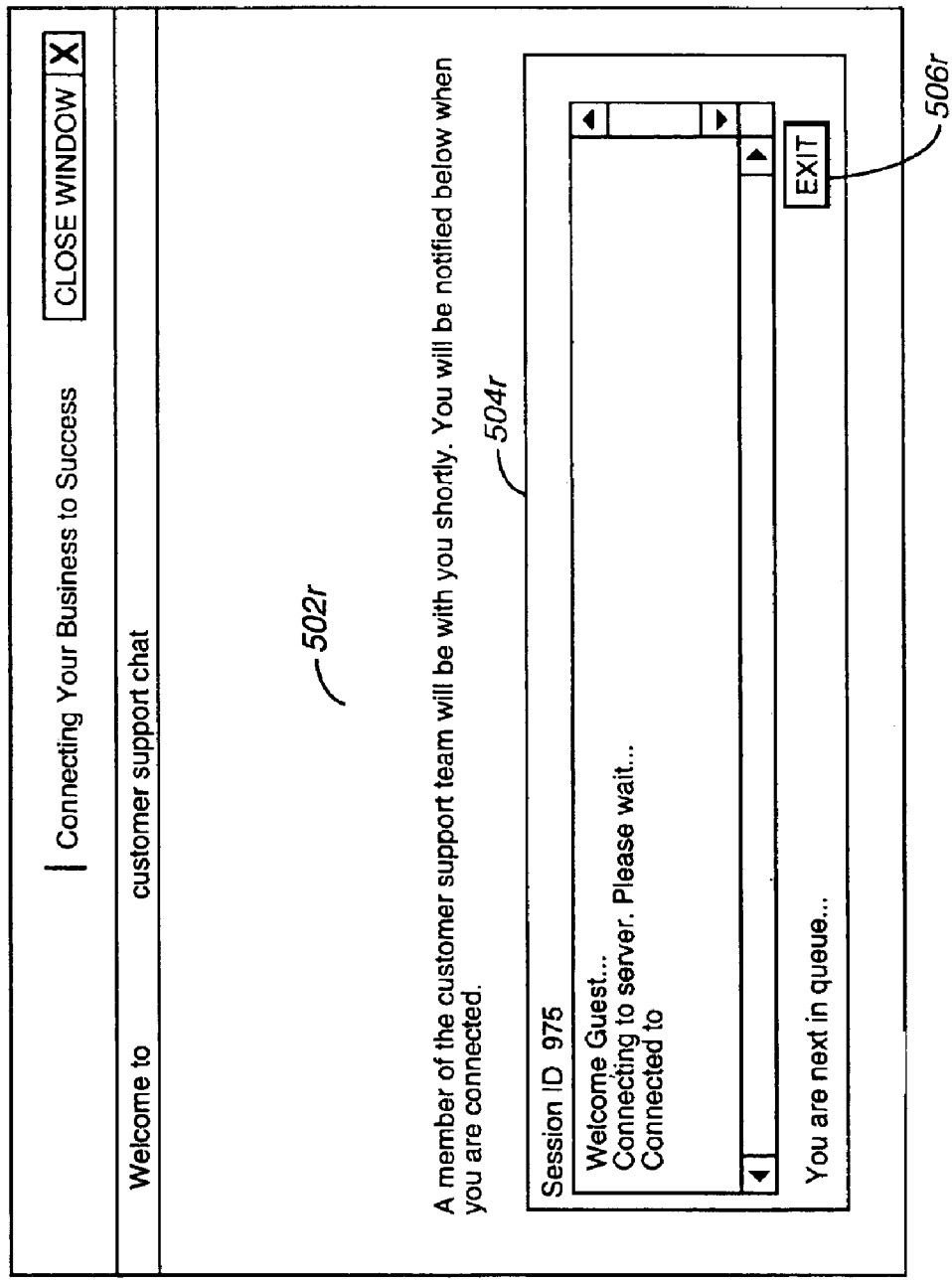

To use the chat feature and contact a specialist on the customer support team (e.g., the customer support 314 and swivel chair operator 316 personnel, etc.), a customer clicks on the "open chat" button 506q and an exemplary open chat dialogue box of FIG. 5r displays. A welcome message is displayed in the section 502r and the customer types his/her inquiry in a text box 504r or clicks on an "exit" button to end the chat session. A copy of the chat session may be printed via a "print" button.

Figure 6A:
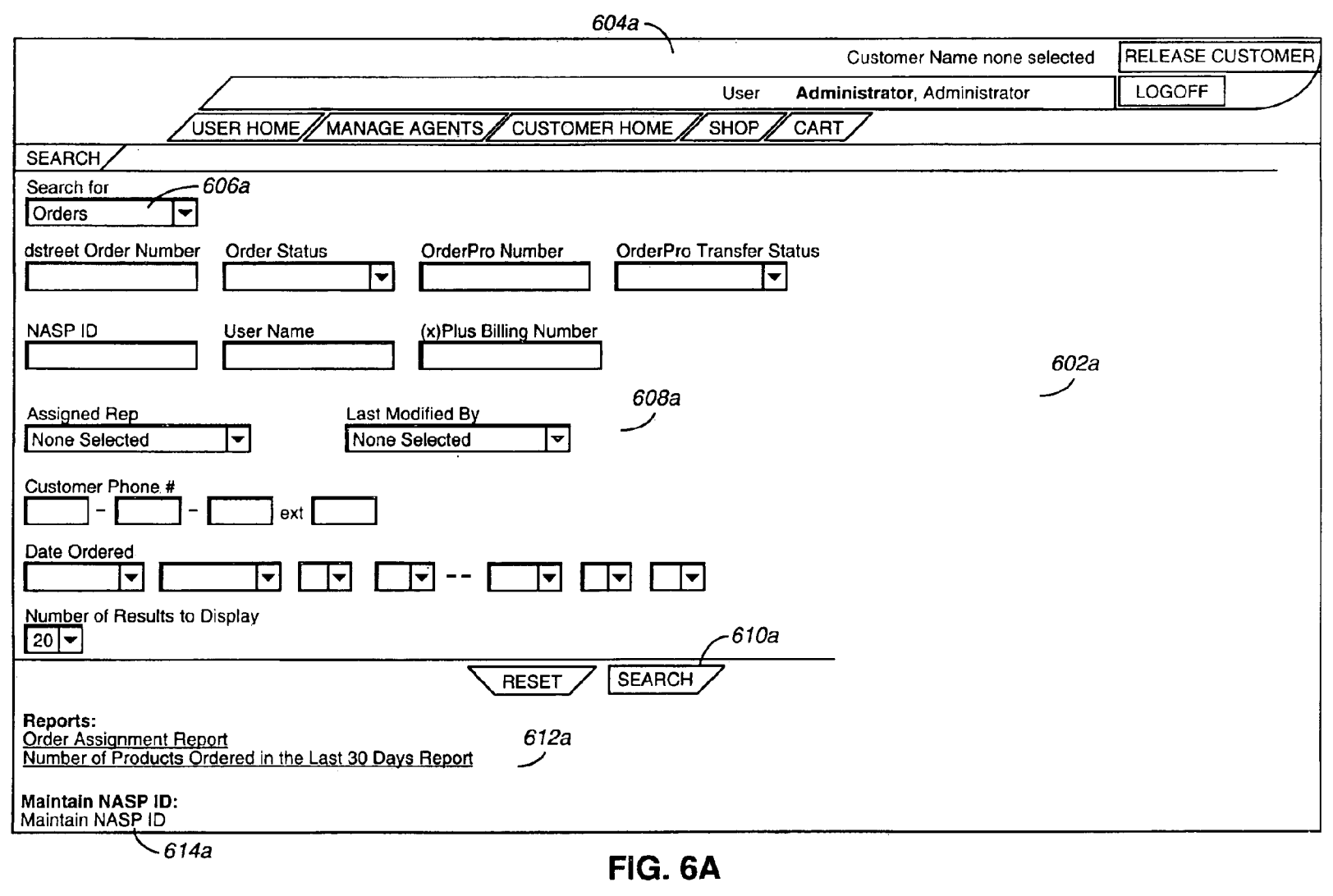

FIG. 6a is an exemplary screen shot illustrating a logged in user "search" screen 602a of the back office graphical user interface (GUI) 542a of the web site after a customer support team member (e.g., the customer support 314 and swivel chair operator 316 personnel, etc., also referred to a "user") is logged in. To log in to the back office GUI 542a, the user points his/her browser to a back office log in IP address and enters his/her user name and password in user name password fields provide in a log in form and clicks a "sign in" button. To log out of a back office session, the user chooses a "log off" tab located in section 604a. The section 604a also includes, for example, "user home," "manage agents," "customer home," "shop, cart," etc., tabs. The search screen 602a also includes, for example, a "search for" dropdown list 606a, a search criteria section 608a, "reset" and "search" buttons 610a, a "reports" section 612a, a maintain "NASP ID" link 614a, etc.

If a user forgets his/her password, a back office administrator may reset same. Each back office customer support team member has a user account for the web site back office GUI 542a. An Administrator may be employed to register new back office users.

An "administrative" login gives a different level of access or permissions. An "administrator," a person who has administrative permissions, may, for example, register new back office users, reset a user's password, create, modify, and delete back office users, etc.

Figure 6B:
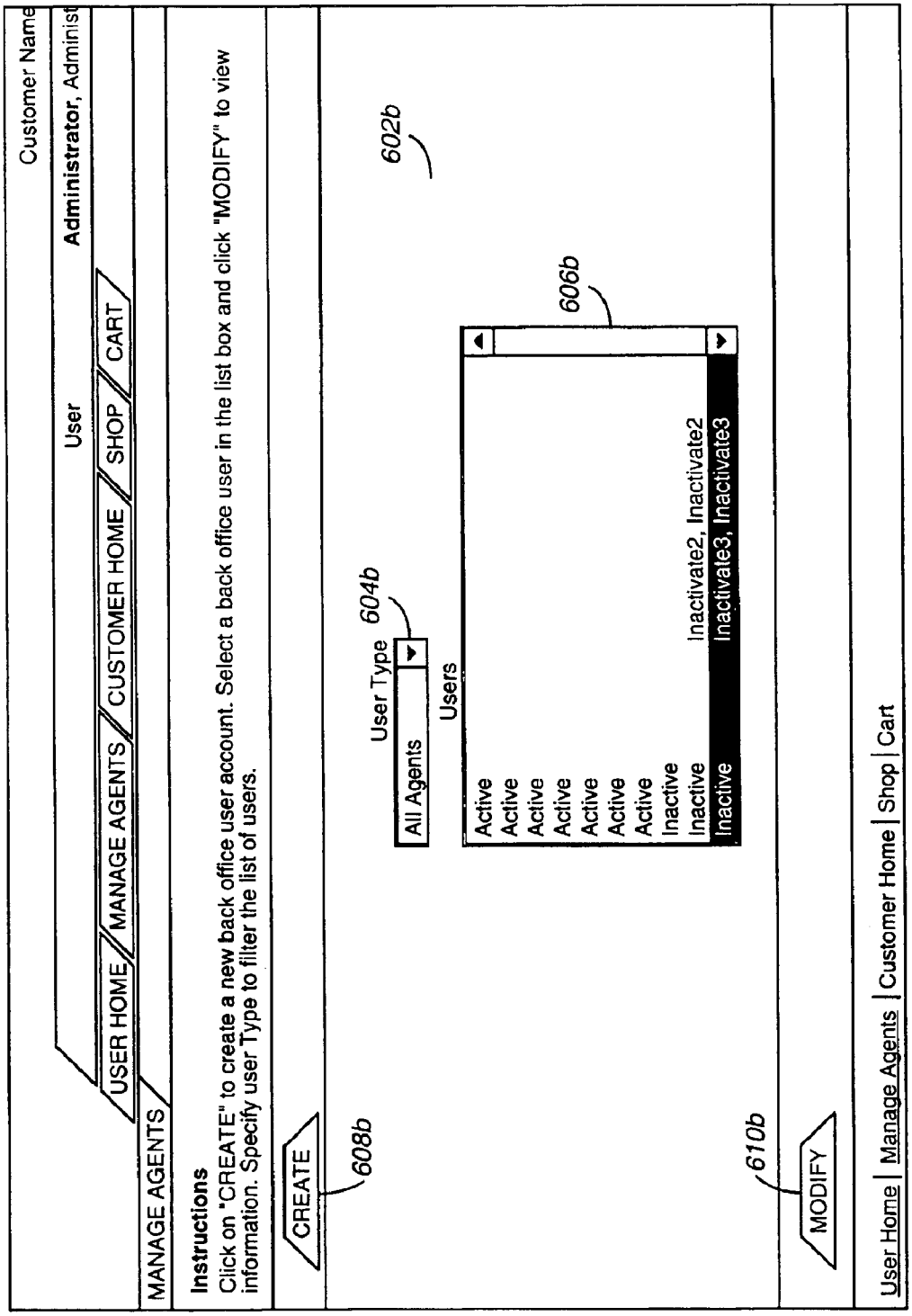
FIGS. 6a–6t are exemplary screen shots illustrating a back office graphical user interface for procuring telecommunications products on-line.
Figure 6D:
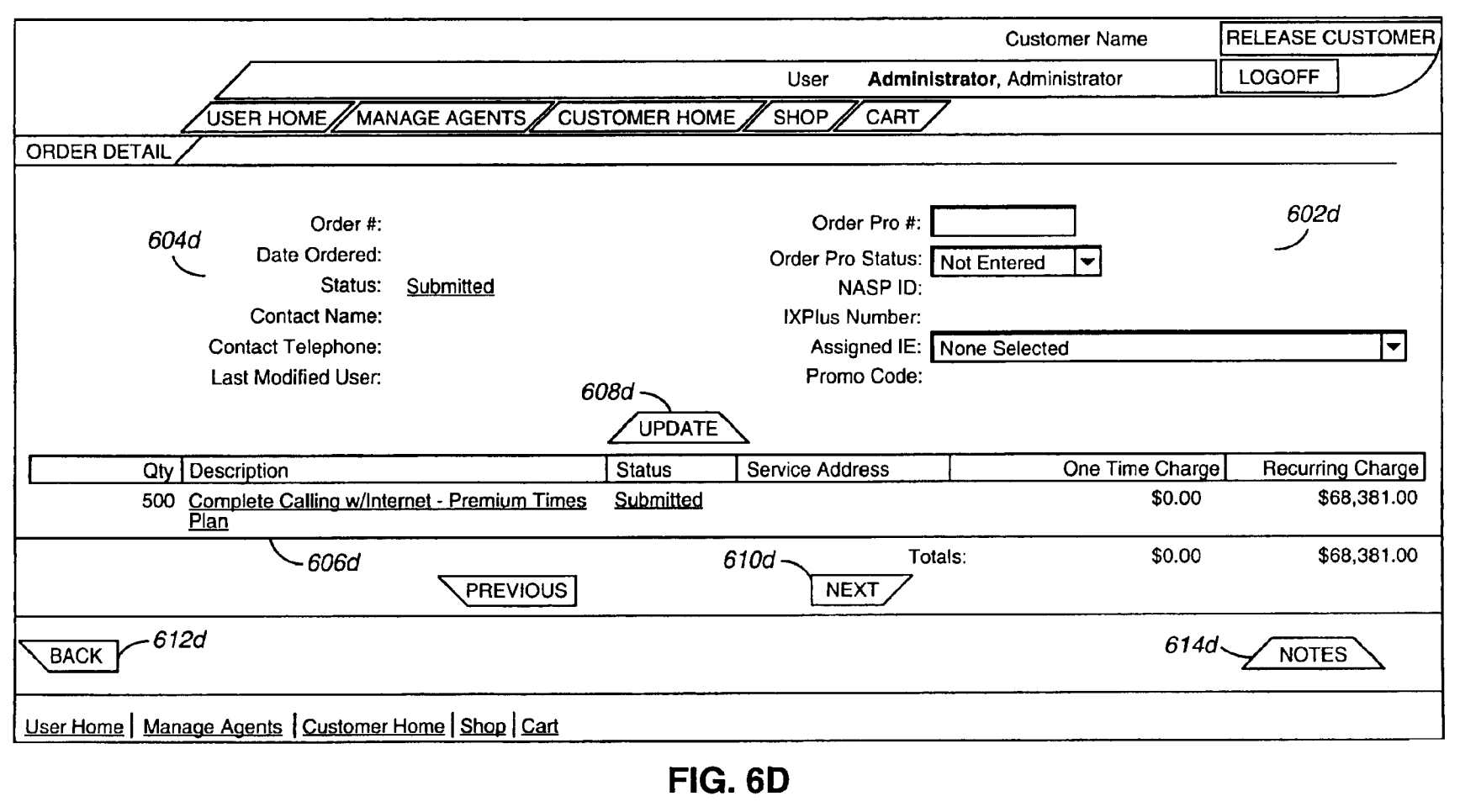

To create and manage back office users, the administrator clicks on a "manage agents" tab in section 604a, clicks on a "create" button 608b in an exemplary "manage agents" screen 602b shown in FIG. 6b, completes "create agent detail information" fields and clicks a "continue" button. To view or modify back office users, the administrator selects an agent from a list box 606b and clicks on a "modify" button 610b.

To modify or make changes to a back office user's profile shown in an exemplary screen 602c of FIG. 6c, the administrator makes changes and clicks on "save" or "cancel" buttons 606c. Such changes may include, for example, changes to a user's password, other information, etc., in section 604c. A dropdown list 604b may be used to select a "user type" for filtering purposes.

The administrator may also assigning orders to an integration engineer (IE). To do the administrator performs a search from the screen of FIG. 6a for an order to be assigned and an order search results page displays. The administrator then clicks a link to an order number in the search results page to display an exemplary "order detail" screen 602d of FIG. 6d displays. The administrator then navigates to an "assigned IE" field in the information section 604d and from a pull down list chooses and IE for order assignment and clicks on an "update" button 608d. The order detail screen 602d also includes, for example, "previous" and "next," buttons 610d, an order summary section 606d, a "back" button 612d, a "notes" button 614d, etc.

Figure 6E:
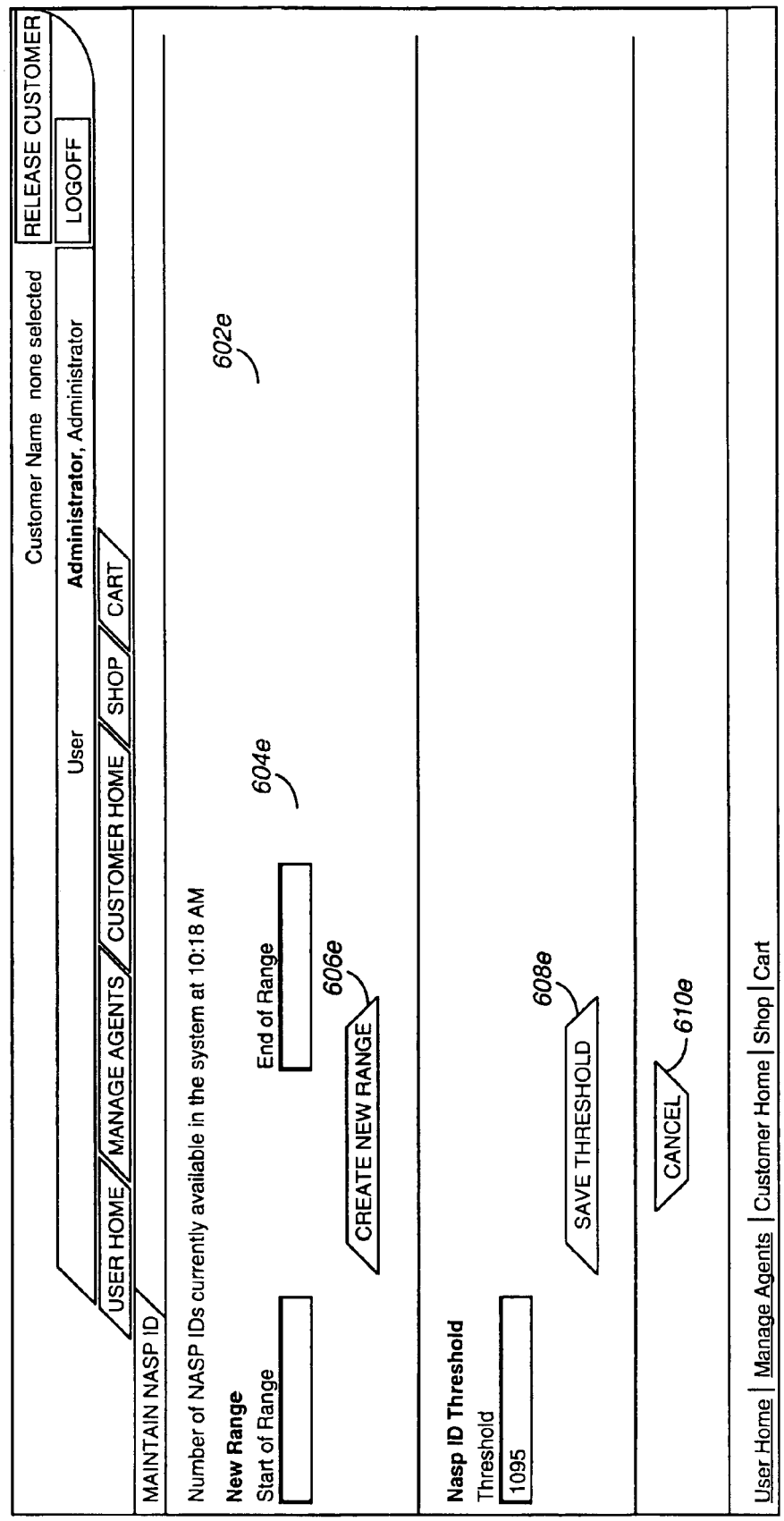

The administrator may also maintain a NASP ID by clicking on the link 614a in the screen of FIG. 6a in which case an exemplary "maintain NASP ID" screen 602e of FIG. 6e displays. The administrator may then update NASP threshold and ranges by entering a new start and end range for NASP IDs in section 604e and clicking a "create new range" button 606e and by entering a new threshold and clicking a "save threshold" button 608e. A "cancel" button 610e is also provided.

To reset a customer's password, a user clicks on the "user home" tab in section 604a, enters a customer's search using the dropdown list 606a and the search criteria 608a. An exemplary customer search results page 602f shown in FIG. 6d displays. The search results page 602f includes, for example, "back," "previous," "next," etc., buttons 610f, search results summary area 604f, sort up down buttons 608f, etc.

Figure 6F:
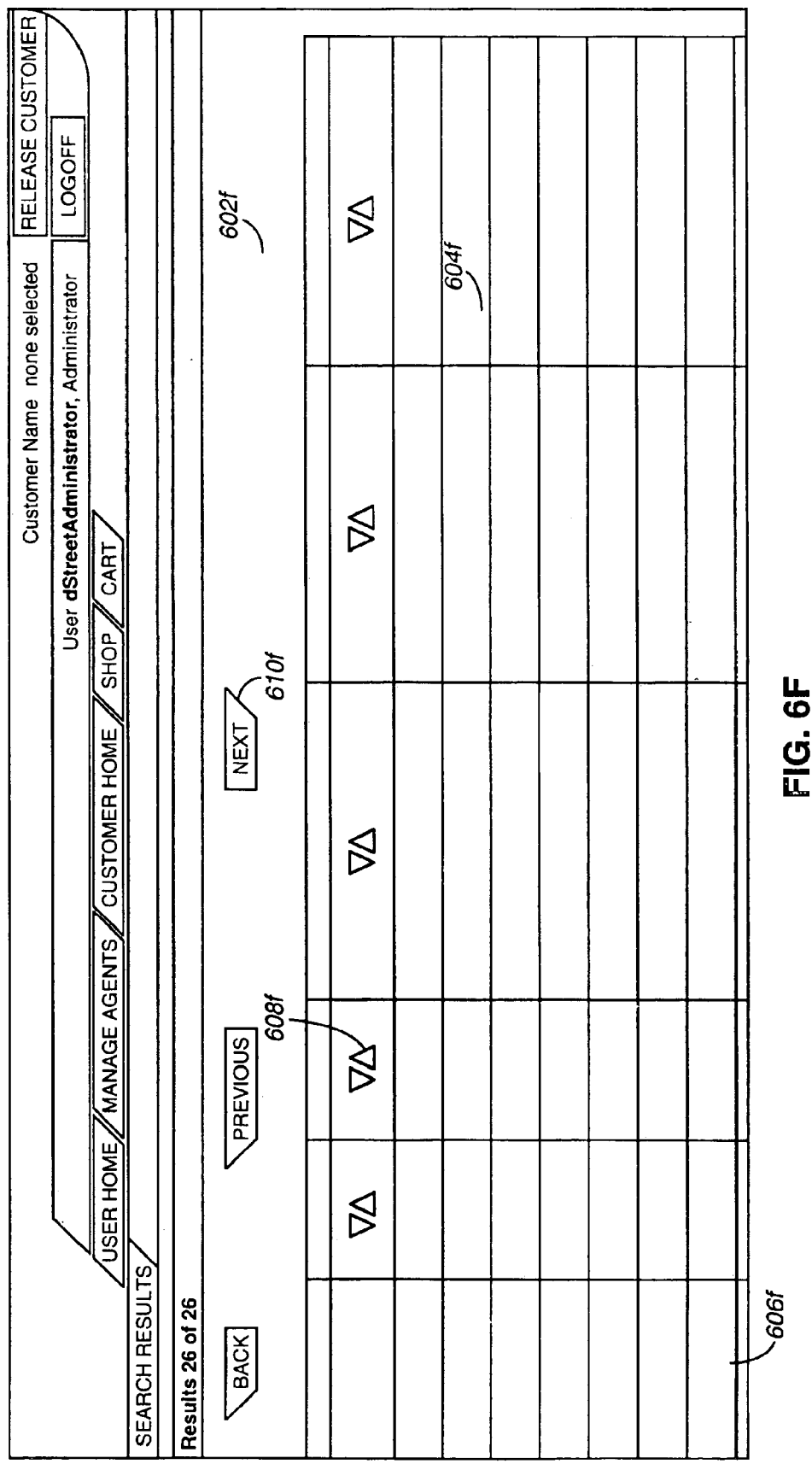
Figure 6G:
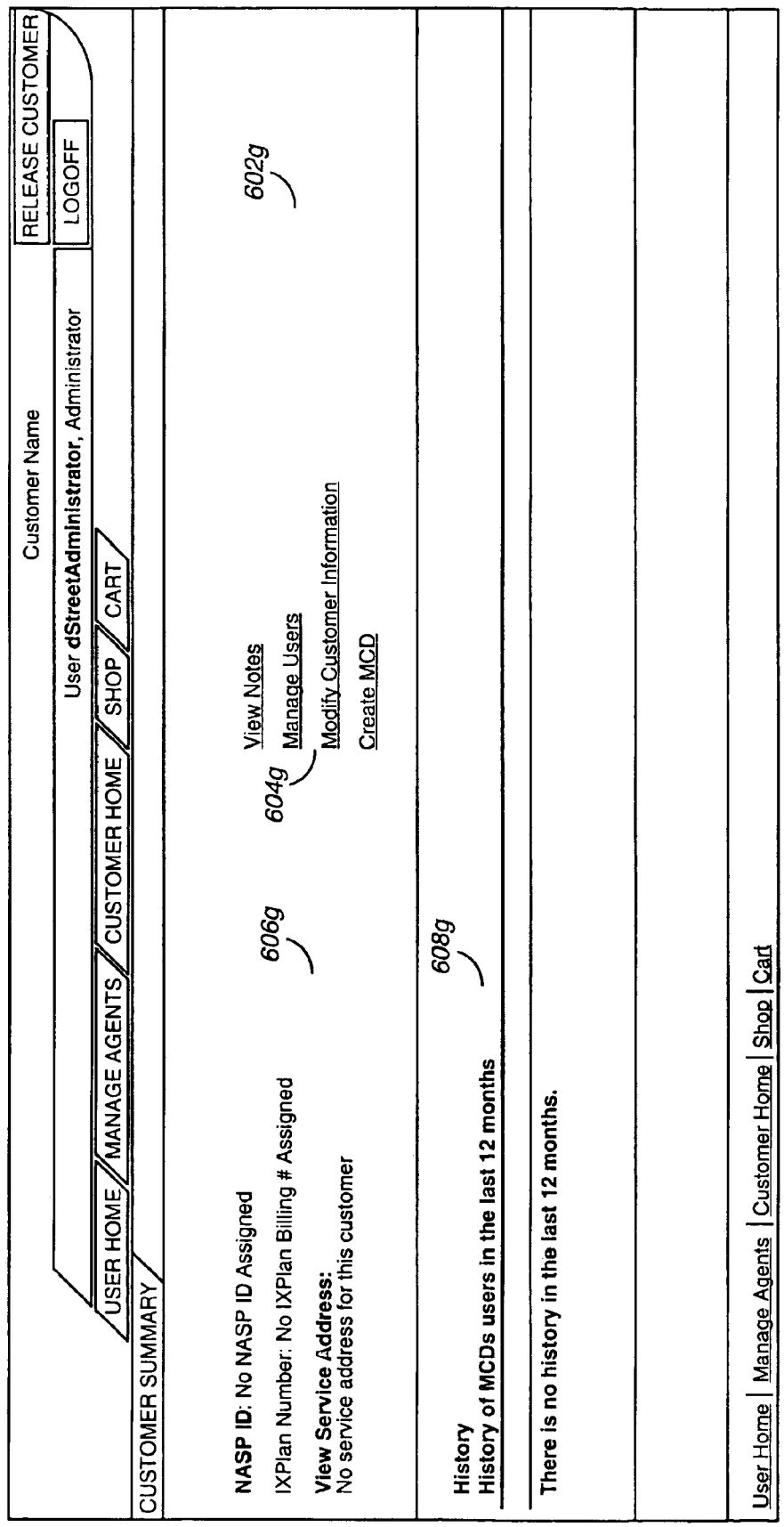

The user then selects the customer from links 606f in the results page 602f and an exemplary customer summary page 602g shown in FIG. 6g displays. The customer summary page 602g includes, for example, a customer information section 606g, "view notes," "manage users," "modify customer information," "create MCD," links, etc., section 604g.

Figure 6H:
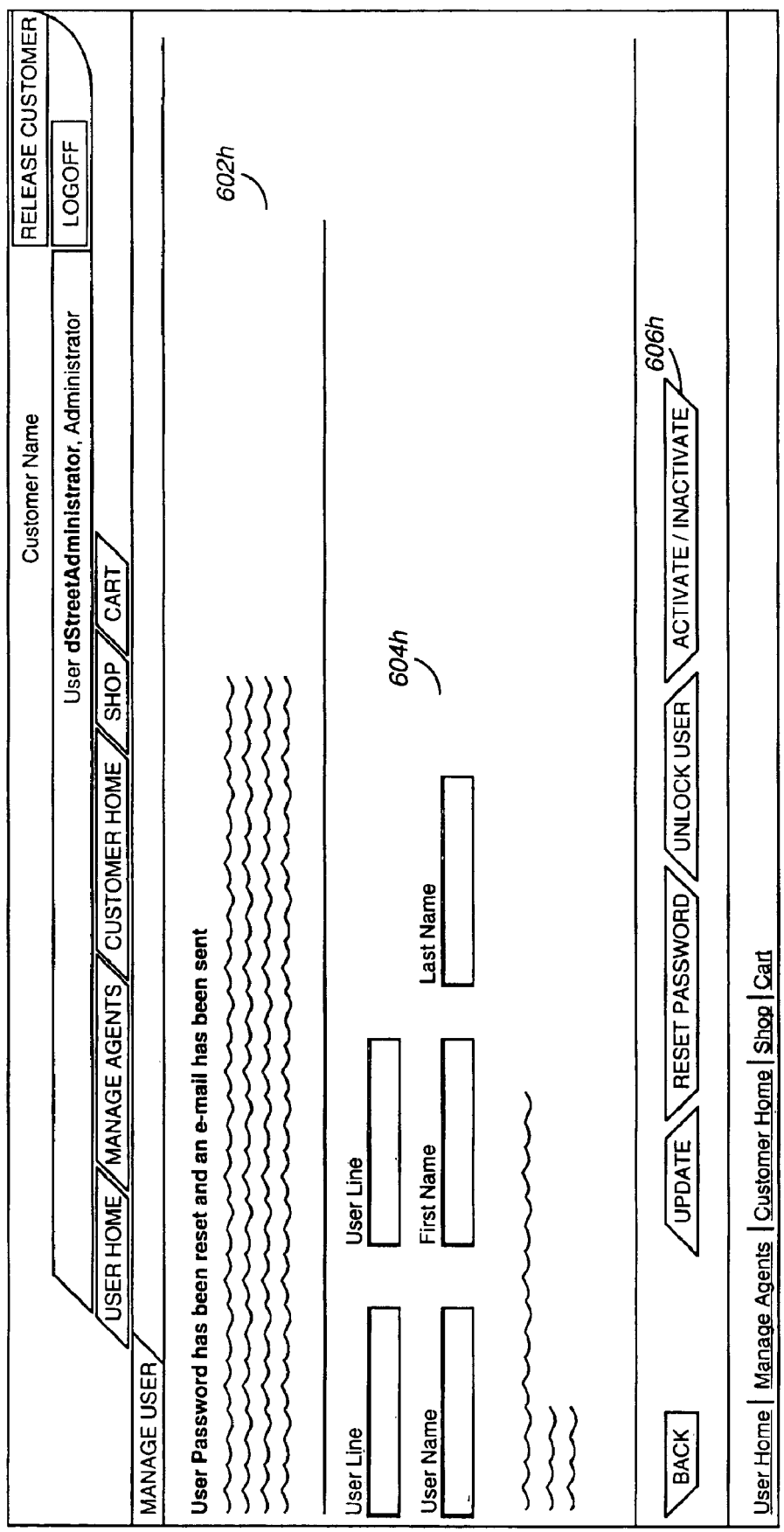
Figure 61:
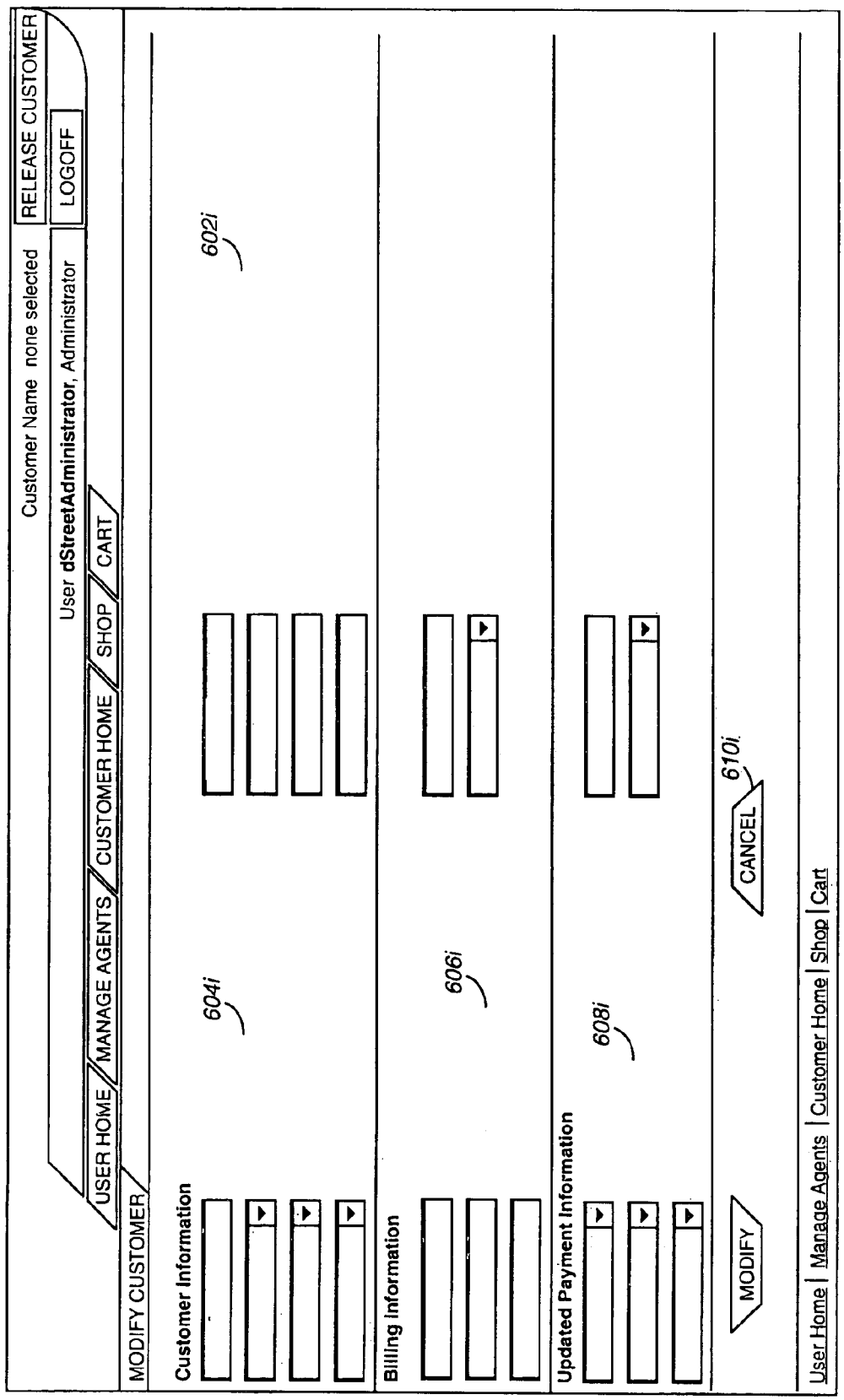
Figure 6K:
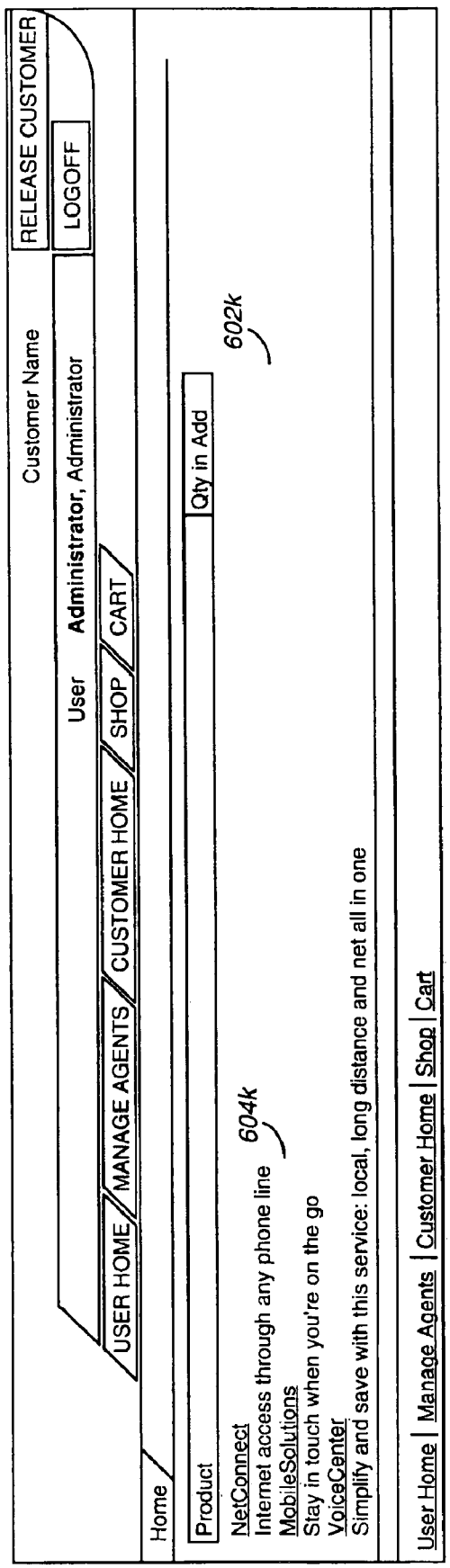
Figure 6L:
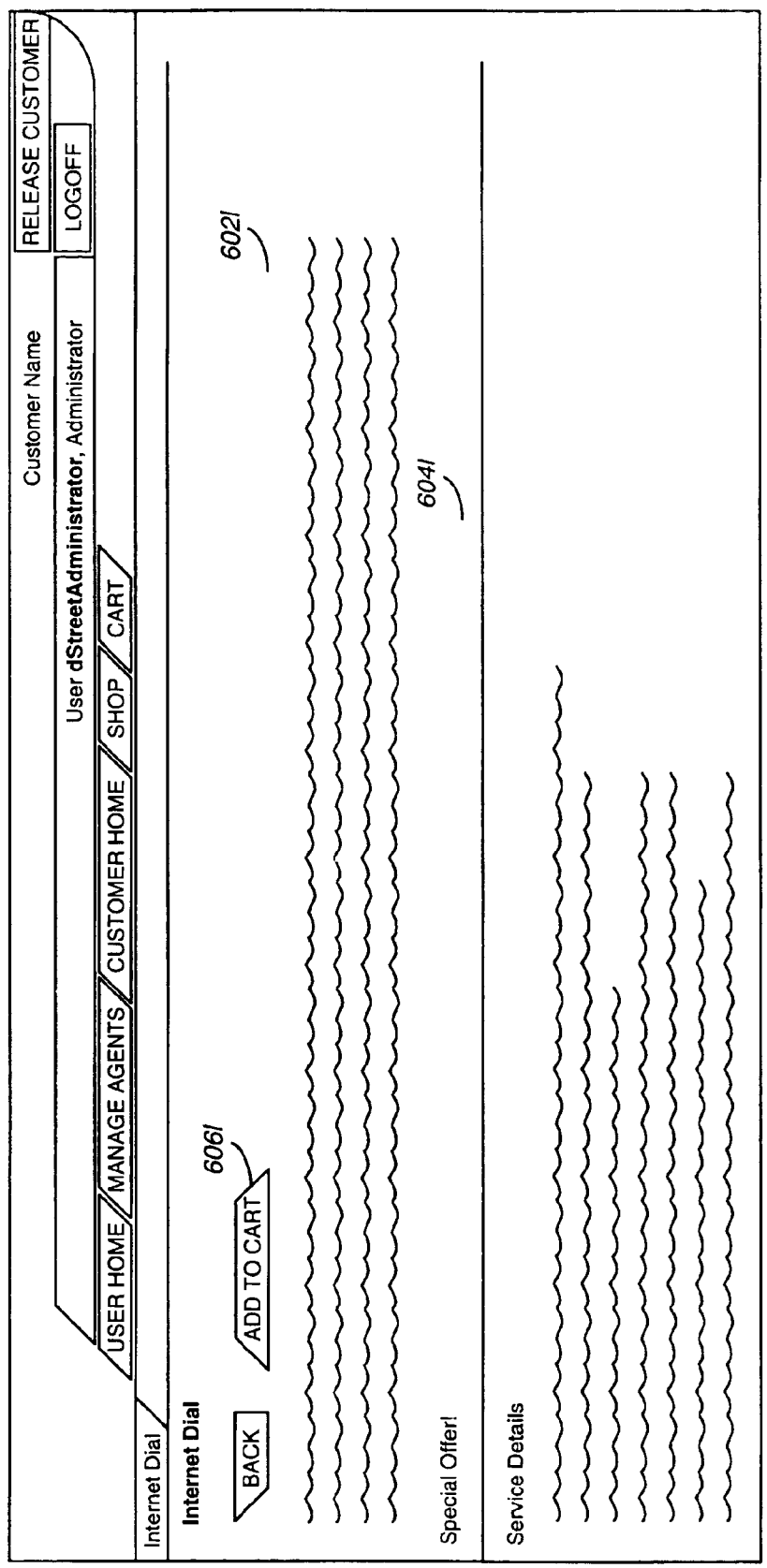
Figure 6N:
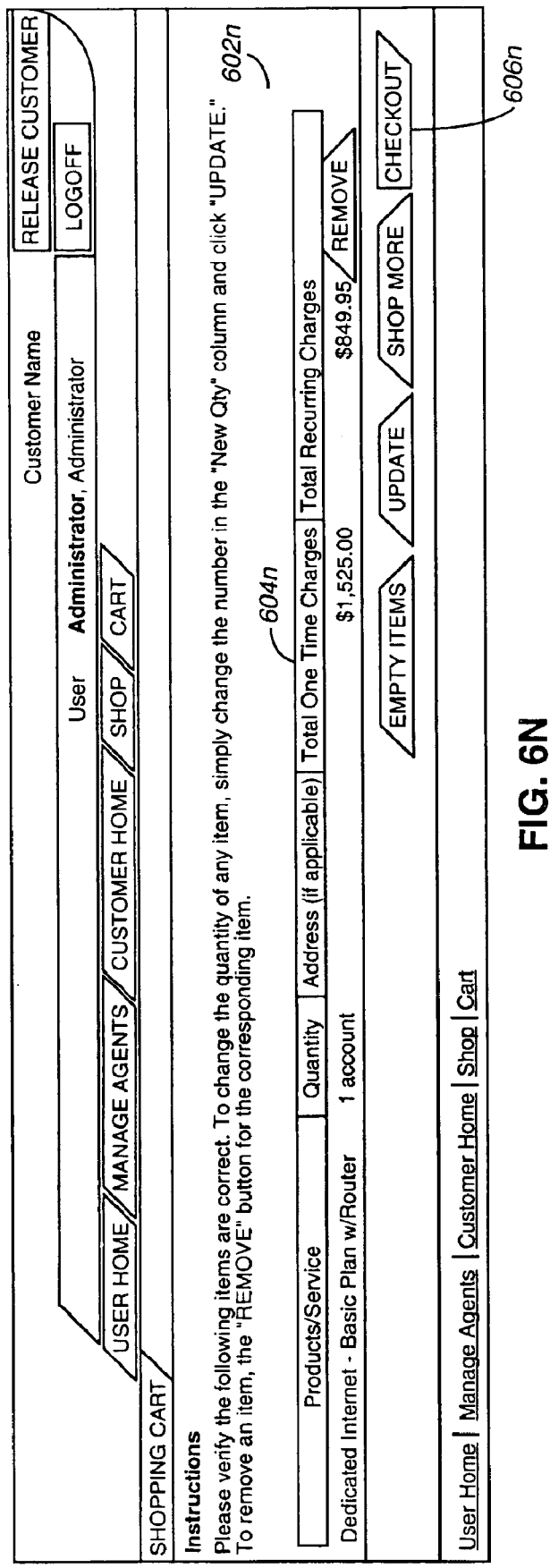
Figure 6Q:
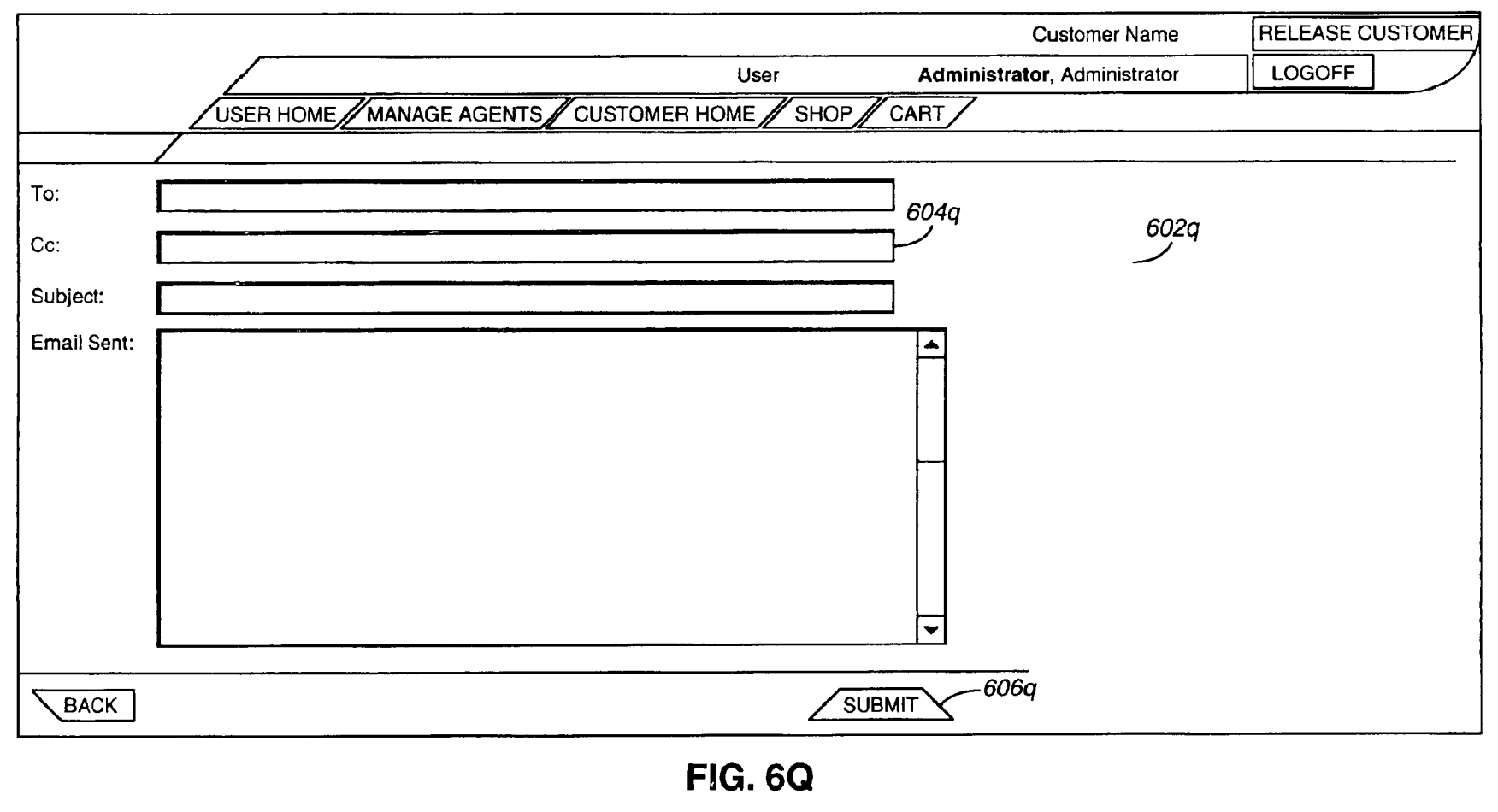
Figure 6R:
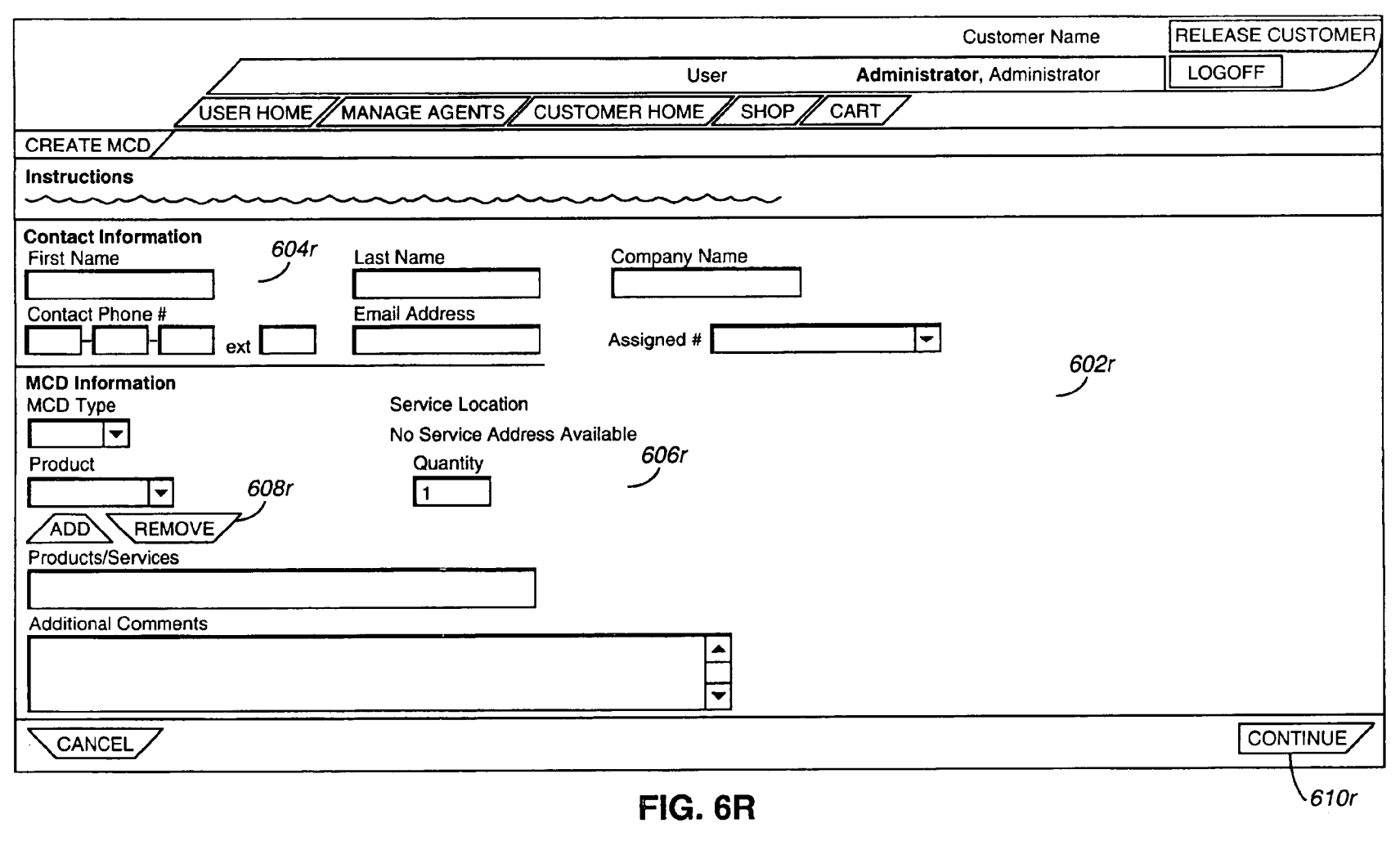
Figure 6S:
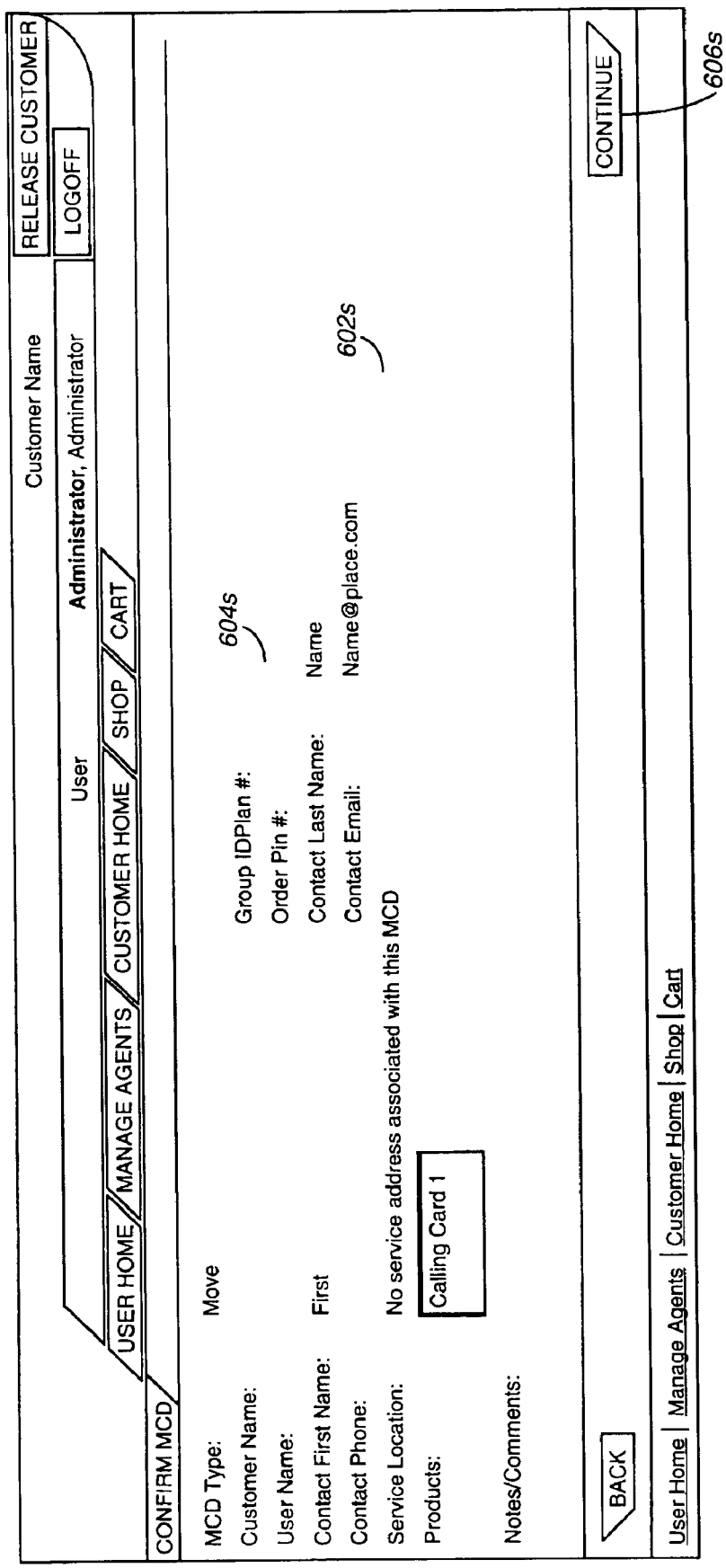

To reset the selected customer's password, the user clicks on the "manage users" link in section 604g and an exemplary "manage users" screen 602h of FIG. 6h displays. The user then clicks on a "reset password" button in a section 606h of the screen 602h to reset the password for the user. A confirmation text message in "red" displays in the screen 602h an e-mail is sent to the customer with new password information. The screen 602h may also include, for example, "back," "modify," "unlock user," "activate/inactivate," etc., tabs in the section 606h and other user information in section 604h.

User profiles can be managed in the back office for both customers 302, 304 and 306 and back office users 314 and 316. A user may view a customer profile by clicking on the "user home" tab in section 604a of FIG. 6a. To display the entire list of customers 302, 304 and 306, the user select "customer" from search dropdown list 606a and clicks on the "search" button 610a. A list of all customers 302, 304 and 306 displays as shown in FIG. 6f. To search for a specific customer or company, the user enters a username/company in the search criteria 608a and clicks on the search button 610a. From the search results page, the user clicks on the "View Customer Profile" link 606f and the customer summary page of FIG. 6g appears. The user then may update customer profile information by clicking on the "modify customer information" link in the section 604g of the "customer summary" screen 602g of FIG. 6g in which case an exemplary "modify customer" screen of FIG. 6i displays. The user may then make the appropriate changes to the customer information fields 604i, billing address 606i fields and payment information fields 608i. The user then clicks on the "modify" or "cancel" buttons in section 610i of the screen 602i.

To view a profile of back office personnel, the administrator chooses a "user type" from the dropdown list 604b of FIG. 6b, chooses a user from the filtered list, 606b, and clicks on the "modify" button 610b to change or view the selected user's profile shown in FIG. 6c.

To view a service address, from the "customer summary" screen 602g of FIG. 6g, the user clicks on a "view service address" link in the customer information section 606g and the exemplary screen 602j of FIG. 6j displays. The user may then enter/view service address details 604j and 606j.

Module—7 Browsing Products From the Back Office

A back office user may obtain product information by activating the "shop" tab in section 604a of FIG. 6a. Selecting the "shop" tab display an exemplary screen 602k shown in FIG. 6k including product links 604k. Clicking on a product link 604k displays product details as shown in the exemplary screens of FIGS. 6l and 6m and including product details 604l, "back" and "add to cart" buttons 606l, and 606m, pricing details 604m, etc.

With the above screens, a user can enter or complete an order for a customer by clicking the "add to cart" button in which case the shopping cart of FIG. 6o appears. The user can then remove, delete a specific item, empty items, empty all items in the cart, update, update the quantity, shop more, continue to shop and add more products, checkout, proceed to the complete the order, etc., for the customer, via sections 604o–608o.

For example, to proceed to checkout, depending on the type of product ordered a product configuration page may appear and if so the user fills out the requested fields and clicks a "next" button. The order details may be reviewed and clicking on a "submit" button commences processing of the order. Otherwise, the user clicks on the "back," "cancel" etc., buttons in section 608o.

To view an order, the user enters an order search, a list of orders appears, the user navigates to the specific order to be viewed, or clicks on the order number to view the order details or clicks the customer name to display customer and order details. To change the status of a submitted order, the user navigates to the order details page of FIG. 6o, choose a specific product on section 606o of order detail page, from a "status" column in section 604o clicks a "submitted" link to drill down into an order status as shown in the exemplary screen 602p of FIG. 6p. The user in section 604p then uses a "change status to" dropdown list to select a new order status. The user then clicks on a "save and send" button in section 606p to generate an e-mail shown in FIG. 6q. The user may also click on a "save and not send" e-mail button or a "cancel" button in section 606p. In a similar manner, tracking the status of an order, updating of order status, etc., may be performed by a user for a customer.

Figure 6T:
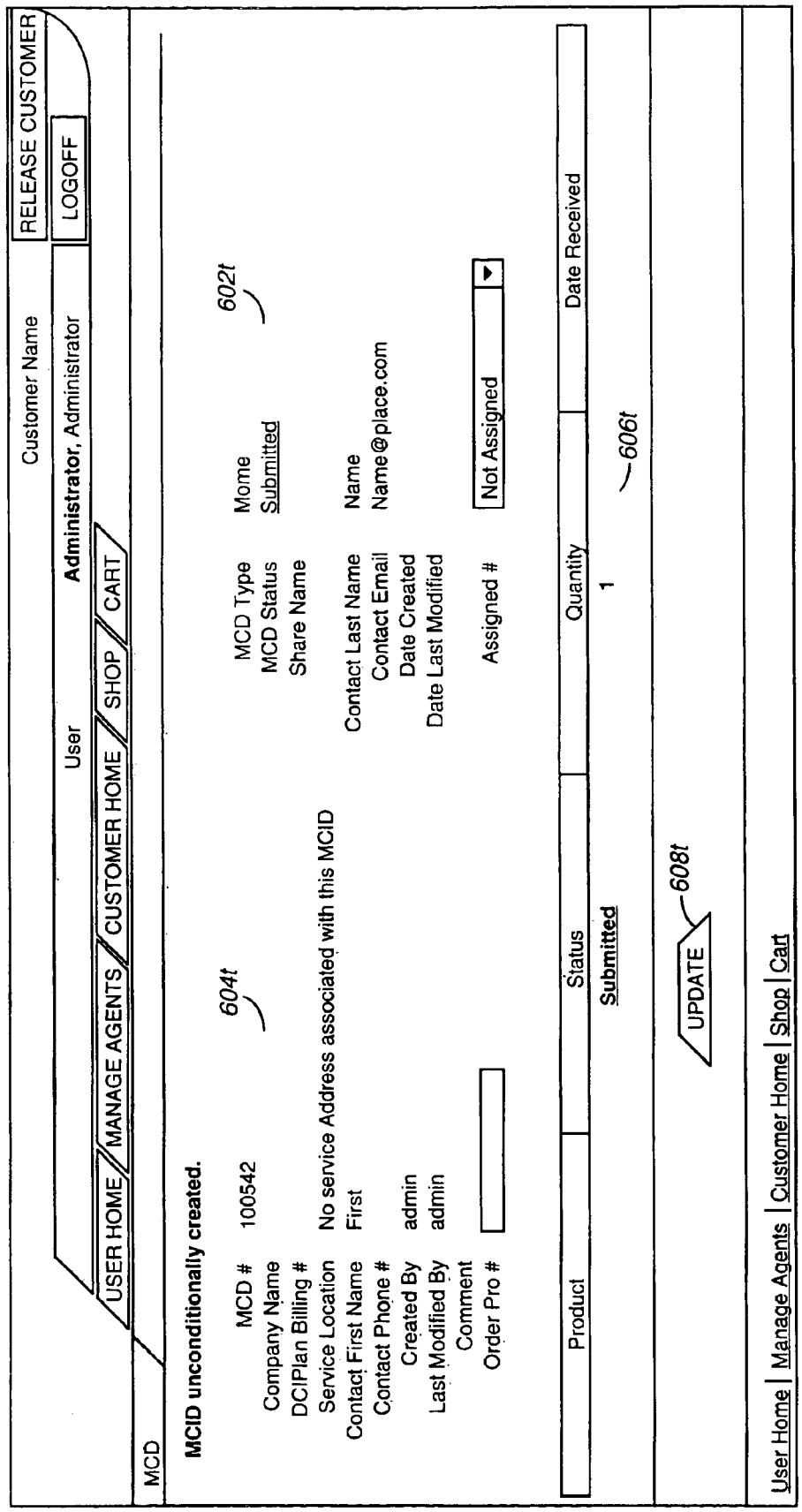

The user may also enter an MCD, by navigating and then clicking on the "create MCD" link of section 604g of the screen 602g of FIG. 6g in which case the exemplary "create MCD" page of FIG. 6r displays. The user may then enter the MCD information (Move, Change or Disconnect details) 604r–606r and click a "continue" button 610r. An exemplary verification screen 602s of FIG. 6s displays. The user then may check all information 604s and click a "continue" button 606s. An exemplary "MCD Successfully Completed" verification screen 602t as shown in FIG. 6t displays including the submitted MCD information 604t.

In addition, searching of an "order," "customer," "MCD," etc., can be performed via the dropdown list 606a of the search screen 602a of FIG. 6a. Further, reports can be created, modified, etc., via the report section 612a.

The present invention may store information relating to various processes described herein. Such information may be stored in one or more memories, such as a hard disk, optical disk, magneto-optical disk, RAM, etc. One or more databases, such as the databases included in the systems and methods of FIGS. 3–6, may store the information used to implement the present invention. The databases may be organized using data structures (e.g., records, tables, arrays, fields, graphs, trees, and/or lists) included in one or more memories, such as the memories listed above or any of the storage devices listed below in the discussion of FIG. 7, for example.

The previously described processes may include appropriate data structures for storing data collected and/or generated by the systems and processes of FIG. 3–6 in one or more databases thereof. Such data structures accordingly may include fields for storing such collected and/or generated data. In a database management system implementation, data may be stored in one or more data containers, each container including records and the data within each record may be organized into one or more fields. In a relational database systems implementation, the data containers may be referred to as tables, the records may be referred to as rows and the fields may be referred to as columns. In an object-oriented database implementation, the data containers may be referred to as object classes, the records may be referred to as objects and the fields may be referred to as attributes. Other database architectures may be employed and may use other terminology. Systems that implement the present invention may not be limited to any particular type of data container or database architecture.

All or a portion of the invention (e.g., as described with respect to FIGS. 3–6) may be conveniently implemented using one or more conventional general purpose computers, microprocessors, digital signal processors, microcontrollers, etc., programmed according to the teachings of the present invention (e.g., using the computer system of FIG. 7), as will be appreciated by those skilled in the computer art. Appropriate software may be readily prepared by programmers of ordinary skill based on the teachings of the present disclosure, as will be appreciated by those skilled in the software art. In addition, the present invention (e.g., as described with respect to FIGS. 3–6) may be implemented by the preparation of application-specific integrated circuits or by interconnecting an appropriate network of conventional component circuits, as will be appreciated by those skilled in the electrical art(s). Further, the present invention may be implemented on the World Wide Web (e.g., using the computer system of FIG. 7).

Figure 7:
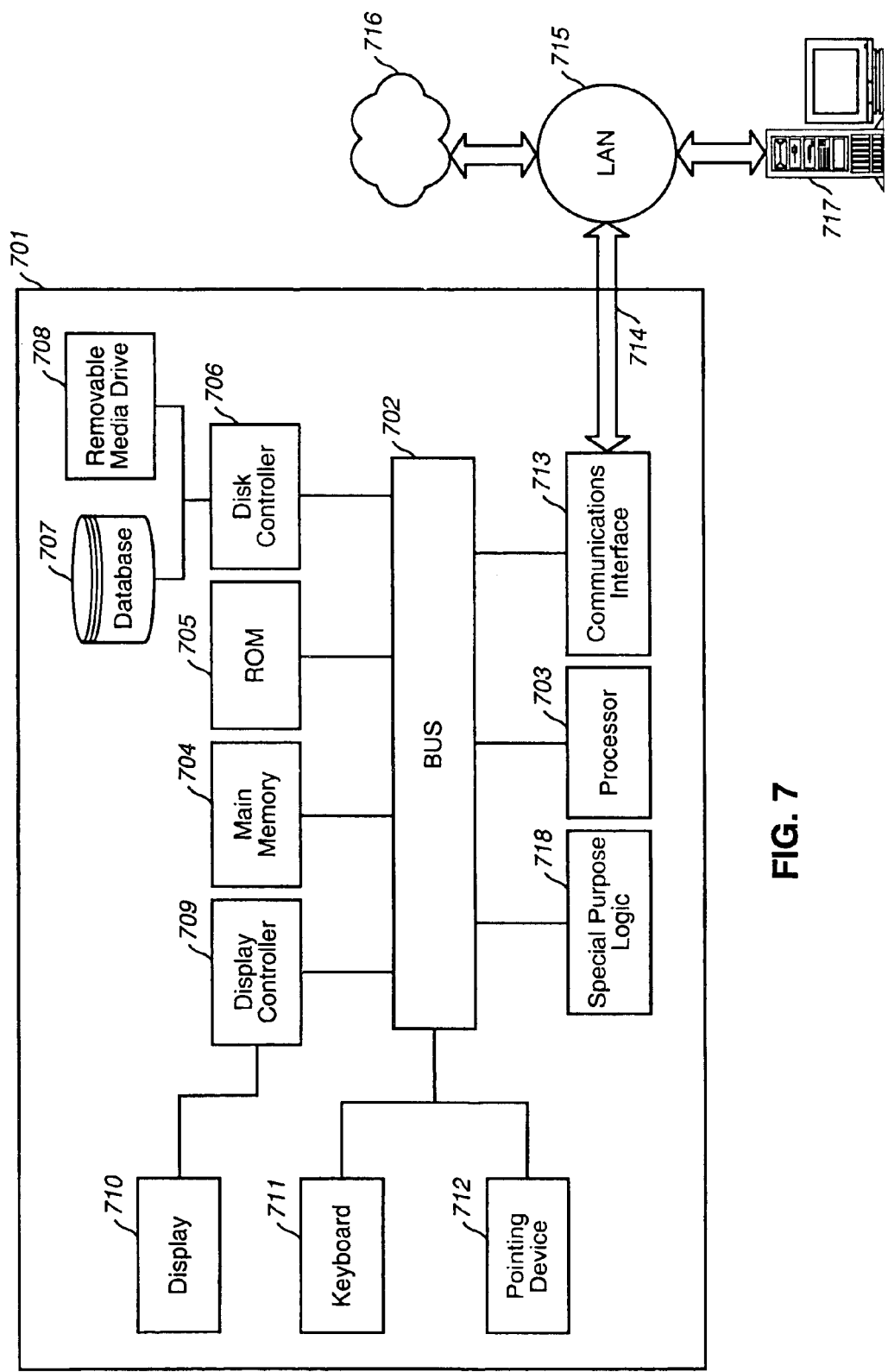
FIG. 7 is an exemplary computer system, which may be programmed to perform one or more of the processes of the present invention.

FIG. 7 illustrates a computer system 701 upon which the present invention (e.g., systems and methods of FIGS. 3–6, etc.) may be implemented. The present invention may be implemented on a single such computer system or a collection of multiple such computer systems. The computer system 701 includes a bus 702 or other communication mechanism for communicating information, and a processor 703 coupled to the bus 702 for processing the information. The computer system 701 also includes a main memory 704, such as a random access memory (RAM), other dynamic storage device (e.g., dynamic RAM (DRAM), static RAM (SRAM), synchronous DRAM (SDRAM)), etc., coupled to the bus 702 for storing information and instructions to be executed by the processor 703. In addition, the main memory 704 can also be used for storing temporary variables or other intermediate information during the execution of instructions by the processor 703. The computer system 701 further includes a read only memory (ROM) 705 or other static storage device (e.g., programmable ROM (PROM), erasable PROM (EPROM), electrically erasable PROM (EEPROM), etc.) coupled to the bus 702 for storing static information and instructions.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices 718, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, etc.

The computer system 701 may also include a display controller 709 coupled to the bus 702 to control a display 710, such as a cathode ray tube (CRT), liquid crystal display (LCD), active matrix display, plasma display, touch display, etc., for displaying or conveying information to a computer user. The computer system includes input devices, such as a keyboard 711 including alphanumeric and other keys and a pointing device 712, for interacting with a computer user and providing information to the processor 703. The pointing device 712, for example, may be a mouse, a trackball, a pointing stick, etc., or voice recognition processor, etc., for communicating direction information and command selections to the processor 703 and for controlling cursor movement on the display 710. In addition, a printer may provide printed listings of the data structures/information of the systems and methods shown in FIGS. 3–6, or any other data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. Execution of the arrangement of instructions contained in the main memory 704 causes the processor 703 to perform the process steps described herein. One or more processors in a multi-processing arrangement may also be employed to execute the sequences of instructions contained in main memory 704. In alternative embodiments, hard-wired circuitry may be used in place of or in combination with software instructions. Thus, embodiments of the present invention are not limited to any specific combination of hardware circuitry and/or software.

Stored on any one or on a combination of computer readable media, the present invention includes software for controlling the computer system 701, for driving a device or devices for implementing the invention, and for enabling the computer system 701 to interact with a human user (e.g., a user of the systems and methods of FIGS. 3–6, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716, such as the Internet. For example, the communication interface 713 may be a digital subscriber line (DSL) card or modem, an integrated services digital network (ISDN) card, a cable modem, a telephone modem, etc., to provide a data communication connection to a corresponding type of telephone line. As another example, communication interface 713 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 713 sends and receives electrical, electromagnetic and/or optical signals that carry digital data streams representing various types of information. Further, the communication interface 713 can include peripheral interface devices, such as a Universal Serial Bus (USB) interface, a PCMCIA (Personal Computer Memory Card International Association) interface, etc.

The network link 714 typically provides data communication through one or more networks to other data devices. For example, the network link 714 may provide a connection through local area network (LAN) 715 to a host computer 717, which has connectivity to a network 716 (e.g. a wide area network (WAN) or the global packet data communication network now commonly referred to as the "Internet") or to data equipment operated by service provider. The local network 715 and network 716 both use electrical, electromagnetic and/or optical signals to convey information and instructions. The signals through the various networks and the signals on network link 714 and through communication interface 713, which communicate digital data with computer system 701, are exemplary forms of carrier waves bearing the information and instructions.

The computer system 701 can send messages and receive data, including program code, through the network(s), network link 714 and communication interface 713. In an Internet example, a server (not shown) might transmit requested code belonging to an application program for implementing an embodiment of the present invention through the network 716, LAN 715 and communication interface 713. The processor 703 may execute the transmitted code while being received and/or store the code in storage devices 707 or 708 or other non-volatile storage for later execution. In this manner, computer system 701 may obtain application code in the form of a carrier wave. With the system of FIG. 7, the present invention may be implemented on the Internet as a Web Server 701 performing one or more of the processes according to the present invention for one or more computers coupled to the Web server 701 through the network 716 coupled to the network link 714.

The term "computer readable medium" as used herein refers to any medium that participates in providing instructions to the processor 703 for execution. Such a medium may take many forms, including but not limited to, non-volatile media, volatile media, transmission media, etc. Non-volatile media include, for example, optical or magnetic disks, magneto-optical disks, etc., such as the hard disk 707 or the removable media drive 708. Volatile media include dynamic memory, etc., such as the main memory 704. Transmission media include coaxial cables, copper wire, fiber optics, including the wires that make up the bus 702. Transmission media can also take the form of acoustic, optical, or electromagnetic waves, such as those generated during radio frequency (RF) and infrared (IR) data communications. As stated above, the computer system 701 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 715 and 716. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but rather covers various modifications and equivalent arrangements, which fall within the purview of the appended claims.

What is claimed is:

1. A method for procuring telecommunications offerings on-line, comprising:

presenting a graphical user interface (GUI), comprising, a telecommunications offerings region located in a portion of the GUI, the telecommunications offerings region including, a voice telecommunications offerings sub-region for providing access to voice telecommunications offerings, an Internet telecommunications offerings sub-region for providing access to Internet telecommunications offerings, a mobile telecommunications offerings sub-region for providing access to mobile telecommunications offerings; and an order region for supporting ordering of one of the voice telecommunications offerings, one of the internet telecommunications offerings, or one of the mobile telecommunications offerings.

2. The GUI of claim 1, wherein each of the voice, Internet and mobile telecommunications offerings sub-regions includes a dropdown menu for displaying telecommunications offerings included therein.

3. The GUI of claim 2, wherein each of the voice, Internet and mobile telecommunications offerings sub-regions includes a high level description of the telecommunications offerings included therein; and the dropdown menu is configured to display over the high level description.

4. The GUI of claim 2, wherein the voice offerings dropdown menu includes at least one of a web link to a complete calling package of telecommunications offering, a web link to a long distance telecommunications offering, a web link to a toll free telecommunications offering, a web link to a conferencing telecommunication offering, and web link to a calling card telecommunications offering.

5. The GUI of claim 2, wherein the Internet telecommunications offerings dropdown menu includes at least one of a web link to a dial up Internet telecommunications offering, and a web link to a dedicated Internet telecommunications offering.

6. The GUI of claim 2, wherein the mobile telecommunications offerings dropdown menu includes at least one of a web link to a paging telecommunications offering, a web link to a conferencing telecommunications offering, a web link to a calling card telecommunication offerings, and a web link to dial up telecommunications offering.

7. The GUI of claim 1, further comprising:

an account access region configured to provide log in and password retrieval functions for existing customers, and to provide a registration function for new customers; and a service and support region configured to provide a support information function and one of an on-line chat and instant messaging functions.

8. The GUI of claim 7, wherein after an existing customer logs in via the log in function, the log in function of the account access region is replaced with a log out function and a welcome message; and the password retrieval and registration functions are replaced with account review, saved product information, notification list, invite colleagues and profile editing functions.

9. The GUI of claim 7, wherein the service and support region includes a web link to an online tool for matching a telecommunications offering with needs of a customer.

10. The GUI of claim 7, wherein the service and support region includes a web link to an on-line tool for qualifying a customer for a telecommunications offering.

11. The GUI of claim 7, wherein the service and support region includes a web link to an on-line demonstration of a process for procuring a telecommunications offering.

12. The GUI of claim 7, wherein the service and support region includes a web link to an on-line shared white board for network diagramming.

13. The GUI of claim 7, wherein the service and support region includes a web link to at least one of listings of partner telecommunications offerings and services available for research and purchase on-line, information describing how specific telecommunications offerings can help businesses and information highlighting growth telecommunications offerings and services.

14. The GUI of claim 7, wherein the account access region includes at least one of a web link to content personalized for an existing customer; a web link for providing access to existing orders, a web link an electronic billing application; a web link to an order tracking function; a web link to a status checking function; and a web link for at least one of sending a page, scheduling a conference call, providing online directory assistance, and providing access to tailored information on one of telecommunications offerings ordered and related telecommunications offerings.

15. The GUI of claim 1, further comprising a region in the GUI for displaying a graphic related to the telecommunications offerings.

16. The GUI of claim 1, further comprising:
a region in the GUI for providing web links to shopping cart, search, glossary, and help functions, and web links to privacy and web site information.

17. Computer-readable media storing computer-executable instructions for performing the steps recited in claim 1.

18. A computer system including a browser configured to display the GUI recited in claim 1.

19. A server including a server program configured to transmit data for displaying the GUI recited in claim 1.

20. A method for servicing telecommunications offerings on-line, comprising:
presenting a graphical user interface (GUI), comprising,
a search region located in a central portion of the GUI, the search region including a search for dropdown list, a search criteria sub-region, and reset and search buttons; and
a tab region located in an upper portion of the GUI and including log off, user home, manage agents, customer home, shop, and cart tabs,
wherein the search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the GUI, the customer home tab is configured to display a customer facing GUI, the shop tab is configured to display web links to information on the telecommunications offerings, and the cart tab is configured to display a window including a shopping cart function.

21. The GUI of claim 20, wherein the GUI is configured to provide order and status tracking functions via the order item from the search for dropdown list, the search criteria information for the selected search item, and the search button.

22. The GUI of claim 20, wherein the GUI is configured to provide an order entry function via the shop and cart tabs.

23. Computer-readable media storing computer-executable instructions for performing the steps recited in claim 20.

24. A computer system including a browser configured to display the GUI recited in claim 20.

25. A server including a server program configured to transmit data for displaying the GUI recited in claim 20.

26. A method for generating a graphical user interface (GUI) for procuring telecommunications offerings on-line, comprising:
generating a telecommunications offerings region located in a portion of the GUI;
generating, in the telecommunications offerings region, a voice telecommunications offerings sub-region for providing access to voice telecommunications offerings;
generating, in the telecommunications offerings region, an Internet telecommunications offerings sub-region for providing access to Internet telecommunications offerings;
generating, in the telecommunications offerings region, a mobile telecommunications offerings sub-region for providing access to mobile telecommunications offerings; and
generating an order region for supporting ordering of one of the voice telecommunications offerings, one of the Internet telecommunications offerings, or one of the mobile telecommunications offerings.

27. Computer-readable media storing computer-executable instructions for performing the steps recited in claim 26.

28. A server including a server program configured to transmit data for performing the steps recited in claim 26.

29. A method for generating a graphical user interface (GUI) for servicing telecommunications offerings on-line, comprising:
generating a search region located in a central portion of the GUI, the search region including a search for dropdown list, a search criteria sub-region, and reset and search buttons; and
generating a tab region located in an upper portion of the GUI and including log off, user home, manage agents, customer home, shop, and cart tabs,
wherein the search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the GUI, the customer home tab is configured to display a customer facing GUI, the shop tab is configured to display web links to information on the telecommunications offerings, and the cart tab is configured to display a window including a shopping cart function.

30. Computer-readable media storing computer-executable instructions for performing the steps recited in claim 29.

31. A server including a server program configured to transmit data for performing the steps recited in claim 29.

32. A method for generating graphical user interfaces (GUIs) for procuring and servicing telecommunications offerings on-line, comprising:
   generating a telecommunications offerings region located in a portion of a first GUI;
   generating, in the telecommunications offerings region, a voice telecommunications offerings sub-region for providing access to voice telecommunications offerings;
   generating, in the telecommunications offerings region, an Internet telecommunications offerings sub-region for providing access to Internet telecommunications offerings;
   generating, in the telecommunications offerings region, a mobile telecommunications offerings sub-region for providing access to mobile telecommunications offerings;
   generating a search region located in a central portion of a second GUI, the search region including a search for dropdown list, a search criteria sub-region, and reset and search buttons; and
   generating a tab region located in an upper portion of the second GUI and including log off, user home, manage agents, customer home, shop, and cart tabs.

33. The method of claim 32, wherein the search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the GUI, the customer home tab is configured to display a customer facing GUI, the shop tab is configured to display web links to information on the telecommunications offerings, and the cart tab is configured to display a window including a shopping cart function.

34. Computer-readable media storing computer-executable instructions for performing the steps recited in claim 32.

35. A system for procuring and servicing telecommunications offerings on-line, comprising:
   a server including a server program configured to transmit data for generating a customer GUI on a customer computer, the customer GUI including a telecommunications offerings region, including a voice telecommunications offerings sub-region for providing access to voice telecommunications offerings, an Internet telecommunications offerings sub-region for providing access to Internet telecommunications offerings, and a mobile telecommunications offerings sub-region for providing access to mobile telecommunications offerings;
   the server program configured to generate a back office GUI on a back office computer, the back office GUI including a search region located in a central portion thereof and including a search for dropdown list, a search criteria sub-region, and reset and search buttons; and
   the back office GUI including a tab region located in an upper portion thereof and including log off, user home, manage agents, customer home, shop, and cart tabs.

36. The system of claim 35, wherein the search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the back office GUI, the customer home tab is configured to display a customer facing GUI, the shop tab is configured to display web links to information on the telecommunications offerings, and the cart tab is configured to display a window including a shopping cart function.

37. A graphical user interface (GUI) apparatus for procuring telecommunications offerings on-line, comprising:
   means for generating a telecommunications offerings region located in a portion of the GUI;
   means for generating, in the telecommunications offerings region, a voice telecommunications offerings sub-region for providing access to voice telecommunications offerings;
   means for generating, in the telecommunications offerings region, an Internet telecommunications offerings sub-region for providing access to Internet telecommunications offerings;
   means for generating, in the telecommunications offerings region, a mobile telecommunications offerings sub-region for providing access to mobile telecommunications offerings; and
   means for generating an order region for supporting ordering of one of the voice telecommunications offerings, one of the Internet telecommunications offerings, or one of the mobile telecommunications offerings.

38. A graphical user interface (GUI) apparatus for servicing telecommunications offerings on-line, comprising:
   means for generating a search region located in a central portion of the GUI, the search region including a search for dropdown list, a search criteria sub-region, and reset and search buttons; and
   means for generating a tab region located in an upper portion of the GUI and including log off, user home, manage agents, customer home, shop, and cart tabs,
   wherein the search for dropdown list is configured to select from a plurality of search items, including orders, customers, and move, change or disconnection (MCD) of an order, the search criteria sub-region is configured with fields and dropdown lists for entering search criteria information for a selected search item, the reset button is configured to clear entered search criteria information, the search button is configured to perform a search based on entered search criteria information, the log off tab is configured to log off a user from an on-line session, the user home tab is configured to display the search region, the manage agents tab is configured to display a window for creating and managing users of the GUI, the customer home tab is configured to display a customer facing GUI, the shop tab is configured to display web links to information on the telecommunications offerings, and the cart tab is configured to display a window including a shopping cart function.

\* \* \* \* \*